(12) United States Patent
Sears et al.

(10) Patent No.: US 12,118,589 B2
(45) Date of Patent: Oct. 15, 2024

(54) CONTROLLING DISPLAY LAYOUT OF DIGITAL CONTENT

(71) Applicant: TABOOLA.COM LTD., Ramat Gan (IL)

(72) Inventors: William Sears, Santa Clarita, CA (US); David Hull, San Gabriel, CA (US); Warren Gibbons, Alhambra, CA (US); Tim Whalen, Pasadena, CA (US); William Gross, Pasadena, CA (US); Thomas McGoven, Pasadena, CA (US)

(73) Assignee: TABOOLA.COM LTD., Ramat Gan (IL)

( * ) Notice: Subject to any disclaimer, the term of this patent is extended or adjusted under 35 U.S.C. 154(b) by 721 days.

(21) Appl. No.: 16/894,004

(22) Filed: Jun. 5, 2020

(65) Prior Publication Data
US 2020/0302485 A1  Sep. 24, 2020

Related U.S. Application Data

(63) Continuation of application No. 15/376,566, filed on Dec. 12, 2016, now Pat. No. 10,719,855, which is a
(Continued)

(51) Int. Cl.
*G06Q 30/0273* (2023.01)
*G06F 16/22* (2019.01)
(Continued)

(52) U.S. Cl.
CPC ......... *G06Q 30/0275* (2013.01); *G06F 16/22* (2019.01); *G06Q 30/0277* (2013.01);
(Continued)

(58) Field of Classification Search
None
See application file for complete search history.

(56) References Cited

U.S. PATENT DOCUMENTS

| | | |
|---|---|---|
| 5,546,502 A | 8/1996 | Hart et al. |
| 5,669,007 A | 9/1997 | Tateishi |
| (Continued) | | |

OTHER PUBLICATIONS

Dumais et al., "Implicit queries {IQ) for contextualized search", Proc. of SIGIR 2004, Sheffield, UK, Jul. 25-29, 2004, New York, ACM Press.
(Continued)

*Primary Examiner* — Bruce I Ebersman
(74) *Attorney, Agent, or Firm* — Myers Wolin, LLC

(57) ABSTRACT

A method of providing Internet commercialization services to a content owner may include obtaining rights from an owner of Web page contents on a Web page to commercialize the Web page contents, obtaining an ad from an advertiser for placement on the Web page, the advertiser agreeing to pay for placement of the ad, paying for traffic to the Web page based on a bid to a traffic partner and sharing profits with the owner of the Web page contents, if any, from payments by the advertiser above payment to the traffic partner for the traffic. The content owner may be a publisher of content on the Internet. The traffic partner may be a search engine. The method may include automatically providing Internet commercialization services to an Internet publisher. Various aspects of the method may be modified in a closed loop fashion to optimize profits.

20 Claims, 28 Drawing Sheets

Related U.S. Application Data continuation of application No. 12/141,814, filed on Jun. 18, 2008, now abandoned.

(60) Provisional application No. 60/936,208, filed on Jun. 18, 2007.

(51) Int. Cl.
*G06Q 30/0241* (2023.01)
*H04L 67/02* (2022.01)
*H04L 67/10* (2022.01)
*H04L 67/306* (2022.01)

(52) U.S. Cl.
CPC .............. *H04L 67/02* (2013.01); *H04L 67/10* (2013.01); *H04L 67/306* (2013.01)

(56) References Cited

U.S. PATENT DOCUMENTS

| | | | |
|---|---|---|---|
| 5,821,929 | A | 10/1998 | Shimizu et al. |
| 6,236,768 | B1 | 5/2001 | Rhodes et al. |
| 6,249,784 | B1 | 6/2001 | Macke et al. |
| 6,269,361 | B1 | 7/2001 | Davis et al. |
| 6,490,579 | B1 | 12/2002 | Gao et al. |
| 6,523,029 | B1 | 2/2003 | Kulyukin |
| 6,529,892 | B1 | 3/2003 | Lambert |
| 6,546,388 | B1 | 4/2003 | Edlund et al. |
| 6,581,050 | B1 | 6/2003 | Horvitz et al. |
| 6,961,731 | B2 | 11/2005 | Holbrook |
| 6,968,333 | B2 | 11/2005 | Abbott et al. |
| 7,099,857 | B2 | 8/2006 | Lambert |
| 7,181,438 | B1 | 2/2007 | Szabo |
| 7,206,791 | B2 | 4/2007 | Hind et al. |
| 7,225,187 | B2 | 5/2007 | Dumais et al. |
| 7,426,499 | B2 | 9/2008 | Eder |
| 7,610,279 | B2 | 10/2009 | Budzik et al. |
| 7,617,199 | B2 | 11/2009 | Budzik et al. |
| 7,617,200 | B2 | 11/2009 | Budzik et al. |
| 7,644,072 | B2 | 1/2010 | Budzik et al. |
| 7,657,518 | B2 | 2/2010 | Budzik et al. |
| 7,836,010 | B2 | 11/2010 | Hammond et al. |
| 7,895,595 | B2 | 2/2011 | Hammond et al. |
| 7,933,906 | B2 | 4/2011 | Hammond et al. |
| 8,374,914 | B2* | 2/2013 | Valencia-Campo ........................ G06F 16/5838 382/218 |
| 2001/0014868 | A1* | 8/2001 | Herz ...................... G06Q 30/02 705/26.1 |
| 2002/0028020 | A1 | 3/2002 | Fujiwara et al. |
| 2002/0087535 | A1 | 7/2002 | Kotcheff et al. |
| 2002/0188527 | A1* | 12/2002 | Dillard ............... G06Q 30/0601 705/26.1 |
| 2003/0005046 | A1* | 1/2003 | Kavanagh .......... G06Q 30/0226 709/203 |
| 2003/0069882 | A1 | 4/2003 | Nieswand et al. |
| 2003/0212669 | A1 | 11/2003 | Dedhia et al. |
| 2004/0064438 | A1 | 4/2004 | Kostoff |
| 2004/0267700 | A1 | 12/2004 | Dumais et al. |
| 2004/0267730 | A1 | 12/2004 | Dumais et al. |
| 2005/0187868 | A1* | 8/2005 | Aspelin .................. G06Q 30/02 705/40 |
| 2006/0004866 | A1 | 1/2006 | Lawrence et al. |
| 2006/0026067 | A1 | 2/2006 | Nicholas et al. |
| 2006/0074883 | A1 | 4/2006 | Teevan et al. |
| 2006/0218138 | A1 | 9/2006 | Weare |
| 2006/0248035 | A1 | 11/2006 | Gendler |
| 2006/0259494 | A1 | 11/2006 | Watson et al. |
| 2006/0294189 | A1 | 11/2006 | Natarajan et al. |
| 2007/0078835 | A1 | 4/2007 | Donnelli |
| 2007/0130126 | A1 | 6/2007 | Lucovsky et al. |
| 2007/0198340 | A1 | 8/2007 | Lucovsky et al. |
| 2007/0198500 | A1 | 8/2007 | Lucovsky et al. |
| 2007/0300152 | A1 | 12/2007 | Baugher |
| 2008/0046407 | A1 | 2/2008 | Shah et al. |
| 2008/0077581 | A1 | 3/2008 | Drayer et al. |
| 2008/0177994 | A1* | 7/2008 | Mayer ..................... G06F 16/00 709/224 |
| 2008/0208668 | A1 | 8/2008 | Heller et al. |
| 2008/0282186 | A1 | 11/2008 | Basavaraju |
| 2008/0288347 | A1 | 11/2008 | Sifry |
| 2009/0192860 | A1 | 7/2009 | Heller et al. |
| 2009/0281989 | A1 | 11/2009 | Shukla et al. |
| 2012/0072274 | A1* | 3/2012 | King .................. G06Q 30/0214 705/14.16 |
| 2012/0116868 | A1* | 5/2012 | Chin .................. G06Q 30/0244 705/14.43 |
| 2012/0284099 | A1* | 11/2012 | Dixon .................... G06Q 30/02 705/14.16 |
| 2013/0046621 | A1* | 2/2013 | Asseoff ................. G06Q 30/02 705/14.51 |

OTHER PUBLICATIONS

Price et al., "Linking by inking: trailblazing in a paper-like hypertext", Proc. of H"YPERTEXT 1998, Pittsburgh, PA, Jun. 20-24, 1998, New York, ACM Press.
Bush, "As We May Think", Atlantic Monthly, Jul. 1945.
Hearst, "Next Generation Web Search: Selling Our Sites", IEEE Data Engineering Bulletin, Special issue on Next Generation Web Search, Sep. 2000.
"Intellext Emerges From Northwestern University's Devlab Incubator with Sollware that Revolutionizes the Way Computer Users Get Information", Jan. 31, 2005, Intellext, Wayback Machine, pp. 1-3.
Henzinger et al., "Query-Free News Search", Proc. of the 12th Intl. Conf_ on the World Wide Web, Budapest, May 20-24, 2003.
Alexa, Available at http://www.alexa.com/.
Alta Vista, Available at http://www.altavista.com.
1-click Answers, Available at http:/fwww.answers/com/main/product_info.jsp.
Autonomy ActiveKnowledge Press Release, Available at http://www.autonomy.com/content/News/Releases/1997/0407.en.html (Apr. 7, 1999).
Excite, Available at http:/fwww.excite.com/.
Google, Available at http://www.google.com/.
Lycos, Available at http:/fwww.lycos.com/.
Yahoo!, Available at http:/fwww.yahoo.com/.
Yahoo! Maps, Available at http://www.maps.yahoo.com/.
Bilsus et al., "A Personal News Agent that Talks, Learns and Explains", Proc. of the 3rd Intl. Cont. on Autonomous Agents, Minneapolis, MN, May 9-13, 1998, ACM Press.
Maglio et al., "SUITOR: An Attentive Information System", Proc. of IUI 2000, New Orleans, LA, Jan. 9-12, 2000, ACM Press.
Trevor et al., "Contextual Contact Retrieval", Proc. of IUI 2004, Funchal, Maderia, Portugal, Jan. 13-16, 2004, ACM Dress.
Bradshaw et al., "Guiding People to Information Providing an Interface to a Digital Library Using Reference as a Basis or Indexing", Proc. of the 2000 Intl. Conf_ on IUI, New Orleans, LA, Jan. 9-12, 2000, ACM Press.
Bradshaw et al., "Automatically Indexing Documents: Content vs. Reference", Proc. of 6th Intl. Cont. of IUI, San Francisco, CA, Jan. 13-16, 2002, ACM Press.
Budzik et al., "Anticipating Information Needs: Everyday Applications as Interfaces to Internet Information Resources", Proc. of 1998 World Cont. of the WWW, Internet and Intranet, Orlando, FL, AACE Press, 1998.
Budzik et al., "Supporting Online Resource Discovery in the Context of Ongoing Tasks with Proactive Software Assistants", Intl. Journal of Human-Computer Studies, vol. 56, No. 1, pp. 47-74, Jan. 2002, Academic Press.
Budzik et al., "User Interactions with Everyday Applications as Context for Just-in-lime Information Access", Proc. of the 2000 Intl. Cont. on IUI, New Orleans, LA, Jan. 9-12, 2000, ACM Press.
Budzik et al., "Information Access in Context", Knowledge Based Systems, vol. 14, Nos. 1-2, pp. 37-53, Sep. 30, 2001.

(56) References Cited

OTHER PUBLICATIONS

Budzik et al., "Supporting on-line resource discovery in the context of ongoing tasks with proactive software assistants", Intl. Journal of Human-Computer Studies, vol. 56, pp. 47-74, Jan. 2002.
Chen et al., WebMate: A Personal Agent for Browsing and Searching, Proc. of the 2nd Intl. Cont. on Autonomous Agents, Sep. 30, 1998, ACM Press.
Chen et al., "The interactive chef: a task-sensitive assistant", Proc. of the 7th Intl. Conf. on IUI, San Francisco, CA, Jan. 13-16, 2002, ACM Press.
Cheng et al., "An Experiment in Enhancing Information Access by Natural Language Processing", Technical Report, Computer Science Division, University of California, Berkeley, CA, CSD-97-963, Jul. 1997.
Dean et al., "Finding related pages in the World Wide Web", Proc. of the 8th Intl. World Wide Web Conf. {Toronto, Canada, May 11-14, 1999, Elsevier.
Hearst et al., "Scatter/Gather as a Tool for the Analysis of Retrieval Results", Proc. of the AAAI Fall Symposium on AI Applications in Knowledge Navigation, Cambridge, MA, Nov. 1995, AAAI Press.
Horvitz et al., "The Lumiere Project: Bayesian User Modeling for Inferring the Goals and Needs of Sollware Users", Proc. of the 14th Cont. on Uncertainty in Artificial Intelligence, Jul. 1998, AAAI Press.
Howe, et al., "SawySearch: A Meta-Search Engine that Learns which Search Engines to Query", A1 Magazine, vol. 18, No. 2, pp. 19-25, Jan. 28, 1997.
Johnson et al., "Integrating Organizational Memory and Performance Support", Proc. of the 1999 Intl. Conf. on IUI, Los Angeles, CA, Jan. 5-8, 1999, ACM Press.
Kulyukin, "Application-Embedded Retrieval from Distributed Free-Text Collections", Proc. of the 16th Natl. Cont. on Artificial Intelligence, Orlando, FL, Jul. 18-22, 1999, ACM Press.
Leake et al., "Selecting Task-Relevant Sources for Just-in-Time Retrieval", Proc. of the AAAI-99 Workshop on Intelligent Information Systems, Orlando, FL, Jul. 18-22, 1999, AAAI Press.
Lieberman, "Letizia: An Agent That Assists Web Browsing", Proc. of the Intl. Joint Cont. on Artificial Intelligence, Montreal, Quebec, Canada, Aug. 20-25, 1995.
Lieberman, "Integrating User Interface Agents with Conventional Applications", Proc. of the 1998 Intl. Cont. on IUI, San Francisco, CA, Jan. 6-9, 1998, ACM Press.
Pazzani et al., "Syskill & Webert: Identifying interesting Web sites", Proc. of the 14th Natl. Conf. on Artificial Intelligence, Portland, OR, Nov. 9-11, 1996, AAAI Press.
Phelps et al., "Robust Intra-document Locations", Proc. of 9th Intl. World Wide Web Conf., Amsterdam, The Netherlands, May 15-19, 2000, Foretec Seminars.
Rhodes et al., "A continuously running automated information retrieval system", Proc. of the 1st Intl. Conf. on the Practical Application of Intelligent Agents and Multi Agent Technology, pp. 487-495, May 1, 1996.
Rhodes, "Margin Notes: Building a Contextually Aware Associative Memory", Proc. of the 2000 Intl. Conference on IUI, New Orleans, LA, Jan. 9-12, 2000, ACM Press.
Salton et al., "A vector space model for automatic indexing", Communications of the ACM, vol. 18, No. 11, pp. 613-620, Nov. 1975.
Salton et al., "Improving Retrieval Performance by Relevance Feedback", Readings in Information Retrieval, San Francisco, CA: Morgan Kauffman, Dec. 1997.
Krema et al., "Themometers and Themostats: Characterizing and Controlling Thematic Attributes of Information", Proc. of IUI 2002, San Francisco, CA, Jan. 13-16, 2002, ACM Press.
Selberg et al., "The MetaCrawler Architecture for Resource Aggregation on the Web", IEEE Expert, Nov. 8, 1996.
Turney, "Learning to Extract Keyphrases from Text", Natl. Research Council Canada, Institute for Information Technology, NRC-41622, Feb. 17, 1999.
Zamir et al., "Grouper: A Dynamic Clustering Interface to Web Search Results", Proc. of the 8th Intl. Cont. on the World Wide Web, Toronto, Canada, May 11-14, 1999, Elsevier.
Budzik et al., "Watson: Anticipating and Contextualizing Information Needs", Proc. of the 62nd Annual Meeting of the American Society for Information Science, Oct. 31-Nov. 4, 1999, Learned Information, Inc., Medford, NJ, 1999.
Budzik, "Information Access in Context", Ph.D. Diss., Northwestern University, Jun. 2003.
Budzik et al., "Beyond Similarity", Working notes of the AAAI 2000 Workshop on AI for Web Search, Austin, Texas Jul. 30-Aug. 1, 2000, AAAI Press.
Budzik et al., "Watson: An Infrastructure for Providing Task-Relevant, Just-In-Time Information", AAAI 1999 Workshop on Intelligent Information Systems, Orlando, FL, Jul. 18-19, 1999.
Budzik et al., "Information access in Context", Knowledge-Based Systems, vol. 14, Nos. 1-2, pp. 37-53, Mar. 2001, Elsevier.
Knoblock et al., "The Ariadne Approach to Web-Based Information Integration", IEEE Intelligent Systems, vol. 5, Sep.-Oct. 1998.
Lieberman et al., "Aria: An Agent for Annotating And Retrieving Images", IEEE Computer, Jul. 2001.
Czerwinsky et al., "Visualizing implicit queries for information management and retrieval, "Proc. of CHI 1999, Pittsburgh, PA, May 15-20, 1999, New York, ACM Press.
Non-final Office Action issued for corresponding family U.S. Appl. No. 15/376,566, dated Apr. 25, 2019.
Final Office Action issued for corresponding family U.S. Appl. No. 15/376,566, dated Sep. 23, 2019.

* cited by examiner

CONTROLLING DISPLAY LAYOUT OF DIGITAL CONTENT

CROSS REFERENCE TO RELATED APPLICATION

This application is a continuation of U.S. patent application Ser. No. 15/376,566, filed Dec. 12, 2016, which is a continuation of U.S. patent application Ser. No. 12/141,814, filed Jun. 18, 2008, which claims the priority of U.S. provisional patent application 60/936,208, filed Jun. 18, 2007, the contents of each of which are hereby incorporated in their entireties by reference.

BACKGROUND OF THE INVENTION

Field of the Invention

This invention is related to commercialization of content on the Internet and particularly to services provided to aid content owners, such as publishers, in commercialization of their content on the Internet.

Description of the Prior Art

Various conventional techniques are available for a content owner, or publisher, to derive revenue or other benefits from their content by for example placing their content on an Internet website together with one or more advertisements from which they derive revenue. A person looking for information on the Internet may find the content owner's website and view the content as well as the advertisements, if any. The content owner may require a fee for viewing the content or benefit from the review of the advertisement, directly if the advertisement is related to the content owner's products or services or indirectly if the content owner receives a fee from a third party related to viewing and/or other actions related to the advertisement.

Such conventional techniques have many limitations. For example, in practice, many content owners have substantial content which is not all well commercialized. Some of the owner's content may be viewed often, providing substantial benefit to the owner while other of the owner's content may not be viewed as often, providing much less benefit to the owner.

What are needed are improved services and techniques for aiding a content owner in commercializing content on the Internet.

SUMMARY OF THE INVENTION

Figure 1:
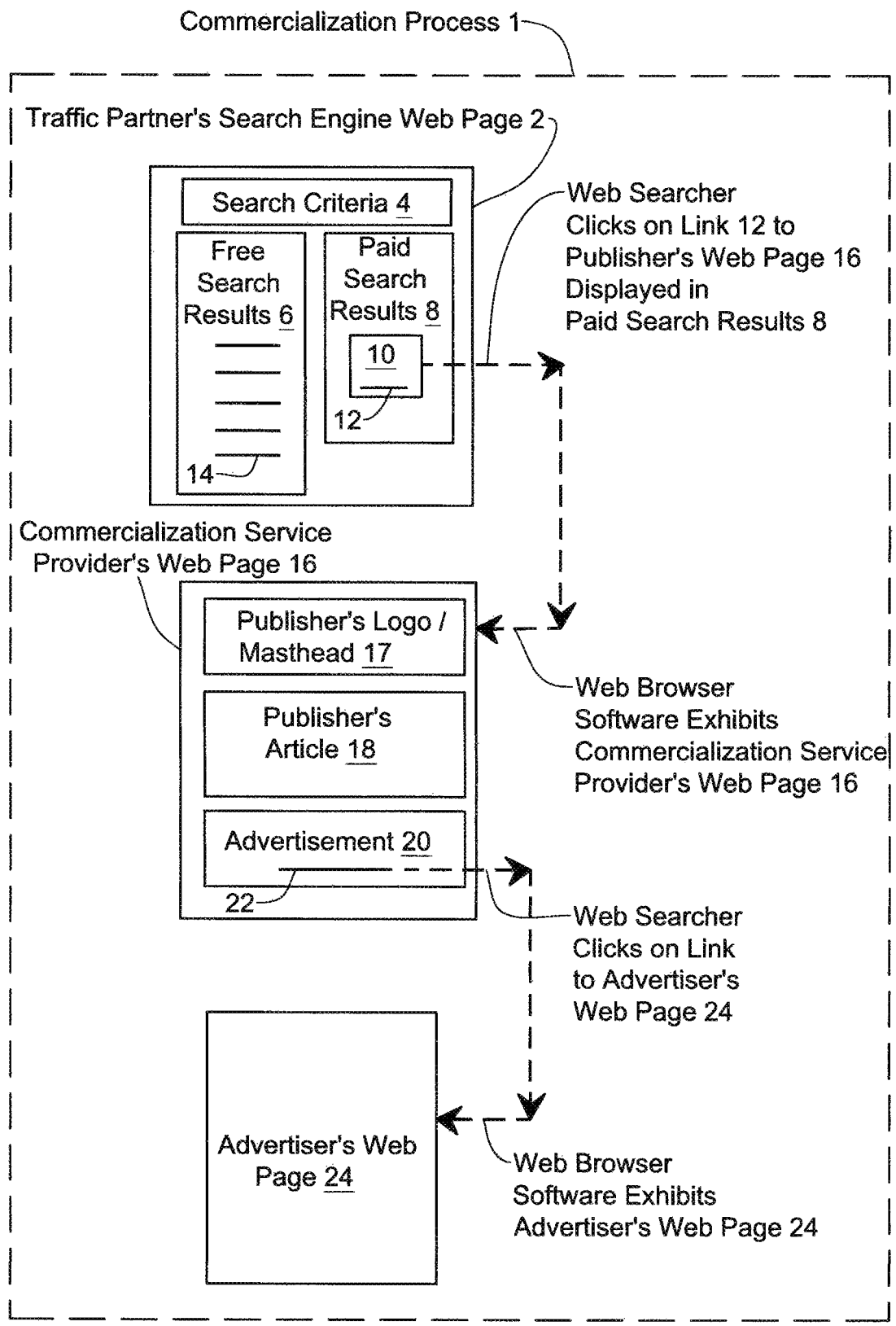
FIG. 1 is a block diagram illustrating an overview of commercialization process 1.

In a first aspect, Internet content commercialization services may be provided to a content owner by obtaining rights from an owner of Web page contents on a Web page to commercialize the Web page contents, obtaining an ad from an advertiser for placement on the Web page, the advertiser agreeing to pay for placement of the ad, paying for traffic to the Web page based on a bid to a traffic partner and sharing profits with the owner of the Web page contents, if any, from payments by the advertiser above payment to the traffic partner for the traffic. The content owner may be a publisher of content on the Internet with a substantial number of Web pages including one or more landing pages and a plurality of article level Web linked from the one or more landing pages. Obtaining rights to Web page content may include obtaining rights to article level Web pages.

The method may include deriving data from traffic to the Web page and modifying aspects of the Web page, excluding the Web page contents, to optimize profits from commercializing the Web page. The Web page may appear to be provided on the Internet by the content owner and modifying the Web page may include maintaining the appearance that the Web page is provided by the content owner. The method may include hosting the modified Web page while maintaining the appearance that the Web page is provided on the Internet by the content owner. The method may also include deriving data from traffic to the Web page for a plurality of modified versions of the Web page and selecting one of the modified versions of the Web page serve to traffic to the Web page based on the data derived to optimize profits. Further, the method may include modifying aspects of the web page on a server hosted by the content owner.

In another aspect, a method of providing Internet commercialization services to an Internet publisher may include obtaining rights from an Internet publisher to serve a Web page, the Web page including article level Web page content owned by the Internet publisher and appearing to be provided on the Internet by the Internet publisher, bidding for traffic for the Web page to an Internet search engine for inclusion of a first ad having text related to the Web page content, and a first link to the Web page, with search engine results provided to someone searching the Internet for information related to the Web page content, obtaining a second ad including a link to a Web page associated with an advertiser agreeing to pay for traffic from the second ad to the Web page associated with the advertiser, modifying the Web page including the article level content to include the second ad, serving the modified Web page in response to selection of the first ad on the search engine search results and compensating the Internet publisher for traffic to the Web page associated with the advertiser resulting from selection of the first ad.

This method may include monitoring data related to the modified Web page and adjusting the bidding in accordance with the data. The method may further include monitoring data related to traffic to the Web page associated with the advertiser from the modified Web page and adjusting the bidding in accordance with the data. The method may also include monitoring data related to traffic from versions of first ad to the modified Web page and selecting the version of the first ad optimizing profits for inclusion in the search engine results. Still further, the method may include monitoring data related to traffic from alternate versions of the modified Web page to the Web page associated with the advertiser and selecting the version of the modified Web page optimizing profits to be served in response to selection of the first ad on the search engine search results.

In another aspect, a method for automatically providing Internet commercialization services to an Internet publisher may include providing access to an Internet publisher to submit a Web page including article level Web page contents, automatically scraping information from the Web page including the article level contents, automatically extracting key words from the article level Web page contents, automatically bidding for traffic to the Web page from a traffic partner based on the key words, automatically submitting the article level Web page contents to a source of ads from advertisers agreeing to pay for traffic from the Web page to Web pages associated with the advertisers, automatically modifying the Web page to include an ad having a link to a Web page associated with an advertiser, receiving compensation from the advertiser for traffic from the modified Web page to the Web page associated with the advertiser and sharing any profits from the compensation from the advertiser, above payments to the traffic partner, with the Internet publisher.

This method may also include monitoring results traffic from the modified Web page to the advertiser's Web page and automatically further modifying the Web page to optimize the profits based on the results. The method may also include monitoring results traffic from the modified Web page to the advertiser's Web page and automatically adjusting the bidding to optimize the profits based on the results. The method may also include monitoring results traffic from the modified Web page to the advertiser's Web page and stopping the bidding to optimize the profits based on the results. Still further, the modified Web page may appear to have been provided on the Internet by the Internet publisher.

The method may include hosting the modified Web page for traffic from the traffic partner, the traffic partner may provide traffic from search engine results and/or the traffic partner may be the source of the ads from advertisers.

DETAILED DESCRIPTION OF THE INVENTION

Referring now to FIG. 1, Internet content commercialization process 1 may be used to help publishers, or other content owners, derive revenue or other benefit from their content. A content owner may include any entity that owns content that can be viewed and a publisher may include any entity which provides a website which people can visit on the Internet, for example to view the content owner's content. The content may include to any information to which the content owner has rights, such as a copyright, including articles, essays, letters, etc. The content owner and publisher could be the same entity, for example, the content owner and publisher could be a newspaper publisher, and the content could include historical articles from the newspaper which may also be available in the newspaper's online archives. For ease of explanation herein, the publisher will be assumed to also be the content owner.

Publishers such as newspaper publishers typically own extensive archives of articles and other content which could have value to interested readers. However, such publishers often have difficulty in fully capitalizing on these assets. Some newspaper publishers have adopted a subscription model in which they charge web searchers, or other people viewing content on the Internet, a fee for viewing or downloading articles in the archives.

Publishers may generate revenue by placing advertisements on the web pages which display their content, such as archived articles. Advertisers are often required to pay the publisher a fee each time a web searcher clicks on the advertisement and thereby causes his web browser software to display the advertiser's web page. However, this pay-per-click approach to advertising has limitations because the publishers often have difficulty attracting web searchers to their archived articles. Internet search engines tend to assign low rankings to archived articles for three reasons: they are old, they are static (i.e., the content doesn't change), and they have few inbound links because they receive little traffic. As a result, search engines might display links to hundreds or thousands of web pages with higher rankings before they display the links to the archived articles—if they display those links at all.

Some publishers have engaged in what has been called search engine optimization in which the publisher attempts to induce search engines to assign a higher ranking (in order to receive more traffic) to the archived articles by, for example, changing the content of the articles periodically, requesting inbound links from other publishers and websites, and increasing the density or frequency of search keywords on the pages or other techniques for improving the ranking of their content. In general, search engine optimization techniques typically deliver the desired results for only a small fraction of the pages in a publisher's content archive. Publishers typically refer to their online archives as "dark content" because web searchers rarely see the articles stored in them.

I.A Commercialization Process

The Internet content commercialization process or system 1 (ICCS) may be used by a commercialization service provider (CSP) to help a publisher derive revenue from content, such as dark content. May content owners have a substantial number of Web pages only some of which include content, described herein as article content. Other pages are typically landing pages, which may present a menu of options, selection of which leads a visitor to linked article level content pages. In this commercialization process, the CSP displays content 18 (such as an article) on CSP's own web page 16 in the publisher's format or in a modified format, purchases traffic to web page 16, and generates revenue or other benefit by displaying contextually relevant ads, such as ad 20. These ads can be pay-perclick advertisements or other forms of Internet Commerce such as pay-per-impression or pay-per-action ads.

FIG. 1 provides a brief overview of this commercialization process 1 with reference to three web pages: search engine web page 2, CSP's web page 16, and third-party advertiser's web page 24.

The CSP may purchase traffic to his web page 16 by cooperating with a traffic partner, most commonly a search engine company such as Google, Yahoo, or Microsoft. The CSP may purchase traffic from a content network, such as Google's AdSense which can drive traffic from another publisher's web site rather than only from a search engine results page. A traffic partner or the entities search engine results page 2 typically displays these elements:

search criteria box 4 in which a web searcher has entered key words,
panel 6 displaying search engine search results with links 14 to relevant web pages, and
panel 8 displaying one or more paid search results, each of which typically includes a brief ad 10 containing a link 12 to CSP's web page 16.

In some cases, ad 10 and link 12 may be incorporated within or otherwise associated with search results 6.

The CSP typically submits to the traffic partner a bid which says, in essence, "If you, the traffic partner, will display on your search engine web page 2 this ad 10 and a link 12 to my web page 16 each time a web searcher enters these key words, then I am willing to pay you this amount of money each time a web searcher clicks on the link 12."

For each key word or combination of key words, the traffic partner typically ranks the various bidders' ads according to at least two criteria: a) the amount of money the bidder has offered to pay for each click or other viewer's action, and b) the historical performance of the ad 10; e.g., the frequency with which web searchers click on bidder's link 12, and thereby generate revenue for the traffic partner or other search engine company. Ads 10 for bidders with the highest rankings are more likely to appear on the first page of the search engine results page 2.

When a web searcher, that is, the person using search engine web page 2, clicks on link 12, the software used by the web searcher (typically a web browser) displays CSP's web page 16, which may include content from the publisher's article 18 and also one or more advertisements 20, each with a link 22 to web page 24 of a third-party advertiser. The CSP typically has an agreement to display advertisements 20 with a revenue partner or other source of ad 20 who may be either the third-party advertiser or an advertising network representing the third-party advertiser. The same entity, such Google, Yahoo, and Microsoft, may be the traffic partner and also operate the Internet advertising networks. In either case, the revenue partner may pay the CSP each time a web searcher clicks on link 16 to advertiser's web page 24. The CSP may share the profits with the publisher or otherwise compensate the publisher.

The CSP may have to pay for all the traffic; i.e., compensate the traffic partner for the visits from all web searchers who visit web page 16 by clicking on link 12 in paid search results panel 8 on search engine results page 2. However, the CSP may only receive revenue from the revenue partner for a subset of those visits, for example, those which result in one or more clicks on link 22 to third-party advertiser's web page 24. As described so far, the CSP makes a profit if he receives more money from the revenue partner for each click on link 22 to third-party advertiser's web page 24 than he has to pay to the traffic partner for each click on link 12 to his own web page 16.

Figure 2:
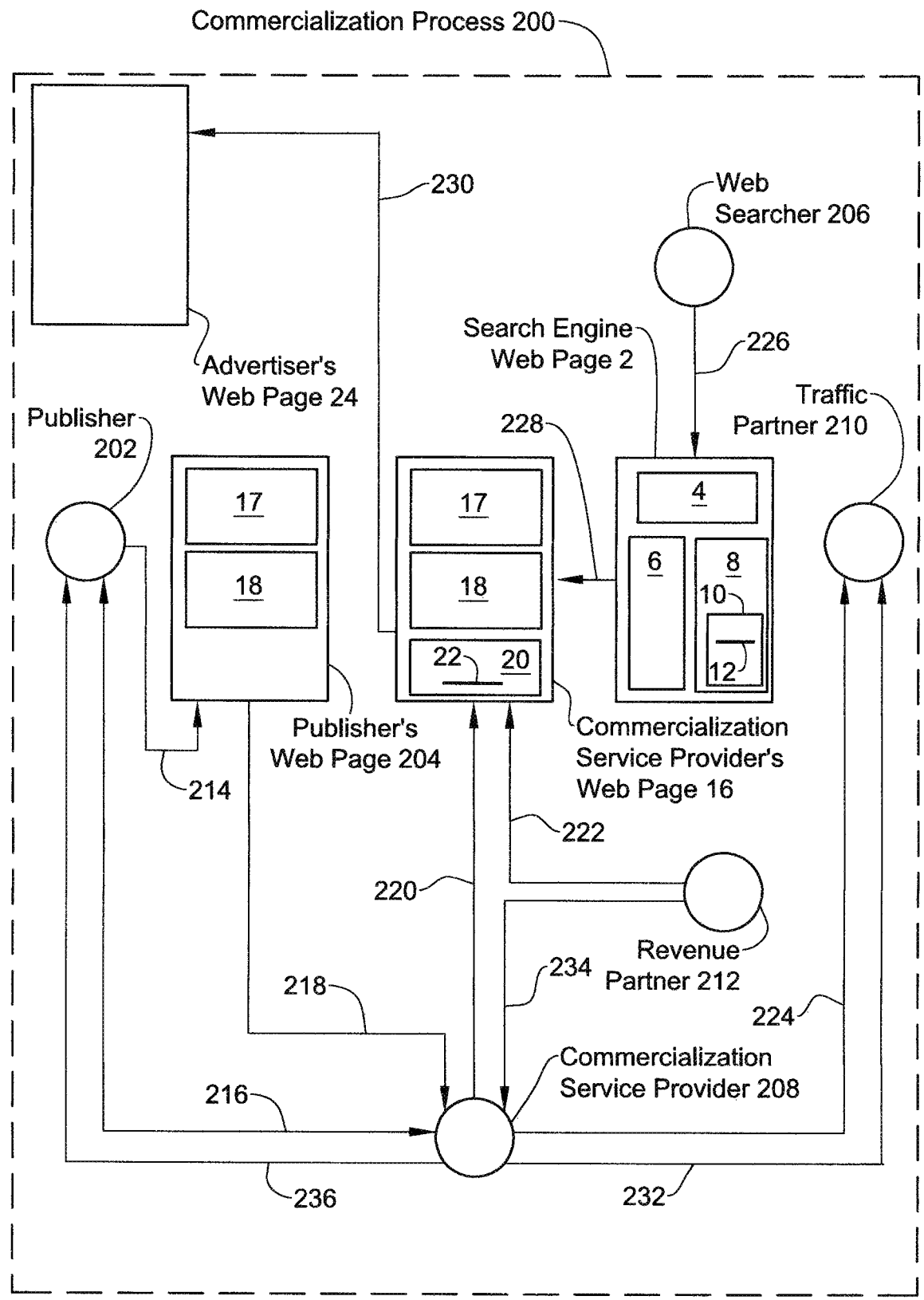
FIG. 2 is a block diagram of commercialization process 200.

Referring now to FIG. 2, detailed commercialization process 200 is a more detailed view of the process illustrated in FIG. 1 including the following entities: publisher 202, web searcher 206, commercialization service provider or CSP 208, traffic partner 210, and revenue partner 212. FIG. 2 also shows publisher's web page 204. Commercialization process 200 includes the following steps:

Step 214: Publisher 202 creates or obtains content. For example, publisher 202 might write or purchase article 18 and display it on web page 204 under his logo or masthead 17.

Step 216: CSP 208 and publisher 202 reach an agreement which specifies their mutual obligations.

Step 218: CSP 208 acquires rights from publisher 202 to display and monetize the content, such as article 18.

Step 220: CSP 208 creates web page 16 which may display publisher's content 18 and publisher's logo/masthead 17 along with other page elements at the discretion of the CSP.

Step 222: Revenue partner 212 provides one or more advertisements 20 which each contain a link 22 to an advertiser's web page 24.

Step 224: CSP 208 sends ad campaign to traffic partner 210 which typically includes a set of key words and one or more text ads, such as ad 10 which may be contextually related to article 18, along with a bid offering to pay traffic partner 210 a specified amount for traffic to web page 16 provided by traffic partner 210.

Step 226: Web searcher 206 searches for information at search engine web page 2 maintained by traffic partner 210. In doing so, web searcher 206 enters key words related to desired information and traffic partner returns search results, such as free search results 6 and/or paid search results 8 shown on traffic partner's search engine web page 2 in FIG. 1, at least one of which includes ad 10 which may be a simple text add including link 12.

Step 228: Web searcher 206 reviews the search results on traffic partner's search engine web page 2, selects ad 10 and clicks on link 12 which leads to CSP's web page 16.

Step 230: Web searcher 206 may read content 18 on CSP web page 16 for information related to the key words and may also read ad 20 and click on link 22 to advertiser's web page 24 in pursuit of further information about the keywords or for other reasons.

Step 232: CSP 208 pays traffic partner 210 for traffic to CSP's web page 16.

Step 234: Revenue partner 212 may pay CSP 208 for traffic to advertiser's web page 24, typically as part of a later accounting.

Step 236: CSP 208 compensates publisher 202 by, for example, sharing profits with publisher 202.

It is important to note that CSP 208 purchases traffic for publisher's article 18 on CSP's web page 16. The purchased traffic, in the form of web searcher 206, may also read ad 10 and click on link 12 and is then directed to web page 16 containing article level content 18. It is important to note that web searcher 206 is linked directly to a web page (CSP's web page 16) including article level content 18 rather than to some other web page at a higher level, such as a landing page without such content, in the hierarchy of pages on a web site.

Web searcher is directed to a web site which may be controlled by CSP 208 or in some situations by publisher 202. That is, link 12 may lead to a subdomain of a website of CSP 208 or alternately of publisher 202. In either event, publisher 202 preferably maintains ownership and control of the content of article 18, while CSP 208 preferably controls the format and appearance of web page 16 on which article 18 is displayed.

Further, commercialization process 200 could operate on a self-service basis in which publisher 202 initiates commercialization process 200 by, for example, entering data on the commercialization service provider's web site such as a list of URL's or other indication of which content CSP 208 should attempt to commercialize. The web pages with content are preferably suitable to automatic scraping, that is, process 200 should preferably be able to automatically obtain the content and other information from the web pages in order to modify the web page and/or otherwise create CSP's web page 206 therefrom.

While the example shown in FIG. 2 discloses a technique based on pay-per-click advertising, pay-per-impression or pay-per-action advertising or similar compensation arrangements may also be used.

I.B Internal Flow Chart for Internet Content Commercialization System

Figure 3:
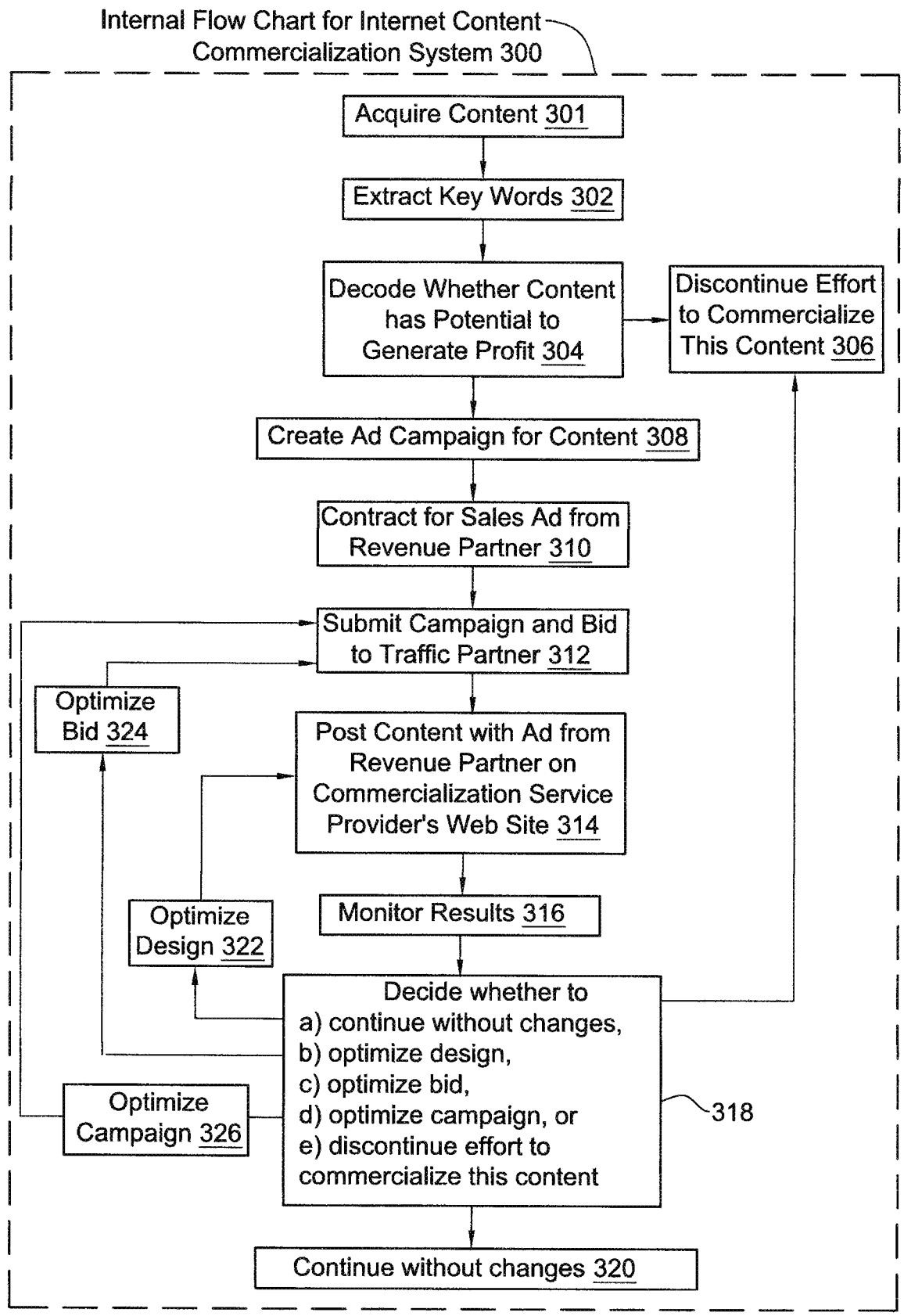
FIG. 3 is a block diagram of commercialization process 300.

Referring now to FIG. 3, flow chart 300 illustrates a technique for improving or optimizing the profits for CSP 208, and/or publisher 202, by improving revenue.

In step 301, CSP 208 acquires content from publisher 202. Although publisher 202 can be any organization or person who owns content and/or provides a website which people can visit, for ease of disclosure, flow chart 300 continues using the specific example in which publisher 202 is a newspaper publisher who wishes to derive revenue from articles such as article 18 in his archives.

In one technique, publisher 202 may provide CSP 208 with the universal resource locators (URLs, or web page addresses) of all the articles or other content publisher 202 wants CSP 208 to commercialize. CSP 208 can then use the disclosed Internet commercialization process to "scrape" the URL targets for content such as article 18. In this process, the content available at the URLS is retrieved, processed and then copied from the publisher's web pages and saved into a content database controlled by CSP 208. Alternately, publisher 202 may prepare a file containing the article content and transmit the file to CSP 208, after which CSP 208 can insert the articles from the file into a content database controlled by CSP 208.

In step 302, key words are extracted from the content, such as article 18. When extracting the key word or key words, the following factors may be considered:
  a) the term frequency, which may be a measure of the frequency with which various terms appear in the article.
  b) the inverse document frequency, which may be a measure of how unusual it is for the term to appear in other, often similar, documents.
  c) the search frequency, which may be a measure of how often web searchers typically enter each candidate key word into the search engine web pages. The major search engine companies have access to this information and typically provide it to commercial partners such as CSP 208. CSP may gather this information from the major search engine companies automatically.
  d) the past experience of process 300. For example, in selecting a key word for an article, process 300 could consider which key words in its data base have successfully driven traffic to articles and generated profits for publishers in the past. Process 300 may also consider which key words have succeeded in the past with the particular search engine company to which it will offer a bid.

To identify the best key word or key words for each article on the basis of all the selected factors, process 300 may employ an algorithm and/or a neural network.

In step 302, process 300 may also index the articles or other content. Indexing is a process of structuring data to make retrieval computationally efficient. For this task, process 300 may employ Lucene (an open-source software tool) and/or SoLR, another body of open-source indexing code which simplifies the process of using Lucene. Lucene may facilitate retrieval of term frequency and inverse document frequency by storing phrases in an "inverted index" designed for storing this type of data.

In step 304, process 300 may analyze whether or not the content has the potential to generate a profit. Some articles in the archive will be unlikely to attract many web searchers. It may not be wise to invest resources in trying to commercialize such articles. Based on criteria similar to those by which it selects key words, process 300 may assign a numerical score to each key word, or to each article, or both. The numerical score, or ranking, indicates the likelihood that the content can generate a profit. If the score is below a certain threshold, process 300 may choose to not make efforts to commercialize this content in step 306 and/to stop attempting to commercialize the content if it has already started to do so. If the score matches or exceeds the threshold value, the system may continue to step Q 308.

Step 308 creates an ad campaign for the content. An ad campaign may include a set of key words and one or more text ads 10 for a given article, expressed in a format which is acceptable to traffic partner 210, usually a search engine company. Process 300 may generate such an ad campaign automatically.

In step 310, CSP 308 arranges for a contract for one or more ads 20 from revenue partner 212. Process 300 could automatically contract for such ads 20 from an advertising network such as Google, Yahoo, Microsoft or Miva. The advertising network could then evaluate the content, such as article 18, and identify ads which are relevant to the article's subject matter. Alternatively, publisher 202 or CSP 208 could sell the ad space directly to a third-party advertiser using a cost per click, cost per impression, cost per action or other protocol.

In step 312, a bid is submitted to traffic partner 210, typically a search engine company. Process 300 can automatically communicate with a computer system associated with traffic partner 210 to submit a bid, which says, in essence, "If you will agree to publish text ad 10 and link 12 to this page 16 whenever a web searcher 206 enters this key word (or any of these key words), then we will agree to pay you $0.XX each time a web searcher 206 clicks on link 12 and thereby visits web page 16" where $0.XX represents the bid price. Process 300 may calculate the amount of money to bid for each click on the basis of the same factors it considers to calculate a numerical score for article 18 in step 304. If the bid exceeds the minimum bid threshold value which the traffic partner 201 has assigned for that key word, traffic partner 210 may begin to display text ad 10 and link 12 to article 18 when a web searcher 206 enters the appropriate key word. Although step 312 is described in terms of pay-per-click advertising for convenience, other types of lead generation or compensation may be used.

In step 308 the content—in other words, article 18—is posted with one or more ads 20 from revenue partner 212 on the CSP's web page 16. Traffic may begin flowing to CSP's web page 16 as soon as any web searcher 206 enters the appropriate key words on traffic partner's search engine web page 2 or through any other process by which traffic is provided. Process 300 may make all, or at least most, of the decisions which normally lie within the purview of a graphic designer; i.e., process 300 may select the typefaces and type sizes for the body text and the headings, the number of columns of text, the images, the size and placement of the images, the color of the background and other design elements, the position of advertisement 20, etc. It is preferable to publish article 18 on web page 16 stored on a server maintained by CSP 208. This approach makes it easier for CSP 208 to experiment with various designs of web page 16 in an effort to maximize the percentage of web searchers 206 who click on link 22 to third-party advertiser's web page 24. However, in some cases, the page may be served from a computer controlled by the publisher, as long as CSP is given control over the layout and format of the page, for example, by inclusion of software on the page that directs control to the CSP, by obtaining rights to log onto an appropriate computer system.

In step 316 the results are monitored. Software programs in process 300 may record the number of visitors (such as web searcher 206) to web page 16, the number of times web searchers 206 click on link 22 to third-party advertiser's web page 24, and other events. On the basis of these data, software tools in process 300 may calculate the profitability of article 18.

In step 318, various decisions may be made. For example, process 300 may decide whether to a) continue the commercialization process 200 without changes, b) optimize the design of CSP's web page 16, c) optimize the bid to traffic partner 210, d) optimize the campaign, or e) discontinue effort to commercialize article 18. The decision depends on the data monitored in step 316. The following steps describe these alternatives.

Step 320 determines if commercialization process 200 should be continued without changes; i.e., without further optimizing the design of web page 16, the bid, or the campaign. Process 300 may select step 320 if, for example, article 18 is generating profit meeting a predetermined threshold.

Step 322 may be used to optimize the design of CSP's web page 16. The purpose of optimizing the design is to increase the probability that web searcher 206 will click on link 22 to third party advertiser's web page 24. In step 322, process 300 may change one or more of several design factors such as the type face, the type size, the background color, and the placement of various elements on web page 16 including article 18, publisher's logo/masthead 17, and/or advertisement 20. Step 322 may be used in order to increase the profitability of web page 16 if it is not meeting expectations or merely to conduct an experiment to determine whether a different design can increase its profitability. As FIG. 3 indicates, step 322 may be part of a feedback loop which returns to step 314.

Step 324 may be used to optimize the bid to traffic partner 210; e.g., to increase or decrease the amount of money which CSP 208 promises to pay traffic partner 210 each time web searcher 206 clicks on link 22. For example, if a high percentage of web searchers 206 who visit web page 16 click on link 22 and thereby generate revenue for CSP 208 and publisher 202, process 300 might raise the bid and thereby induce traffic partner 210 to display text ad 10 and link 12 more frequently and/or at a higher position. Conversely, if a low percentage of web searchers 206 who visit web page 16 click on link 22, process 300 might lower the bid. Step 324 is part of a feedback loop which reverts to step 312. The optimal bid may depend on the value of the click out; e.g., the amount of money which revenue partner 212 pays CSP 208 each time web searcher 206 clicks on link 22 to advertiser's web page 24.

Step 326 may be used to optimize the ad campaign by techniques such as adding new key words, deleting key words, adding new text ads, deleting text ads, or modifying the instructions stating which key words may be paired with which text ads. Step 326 is part of a feedback loop which reverts to step 312.

During Step 318, process 300 may decide to discontinue efforts to commercialize this content, in which case the process advances to step 306.

I.C The Internet Content Commercialization Process

Figure 4:
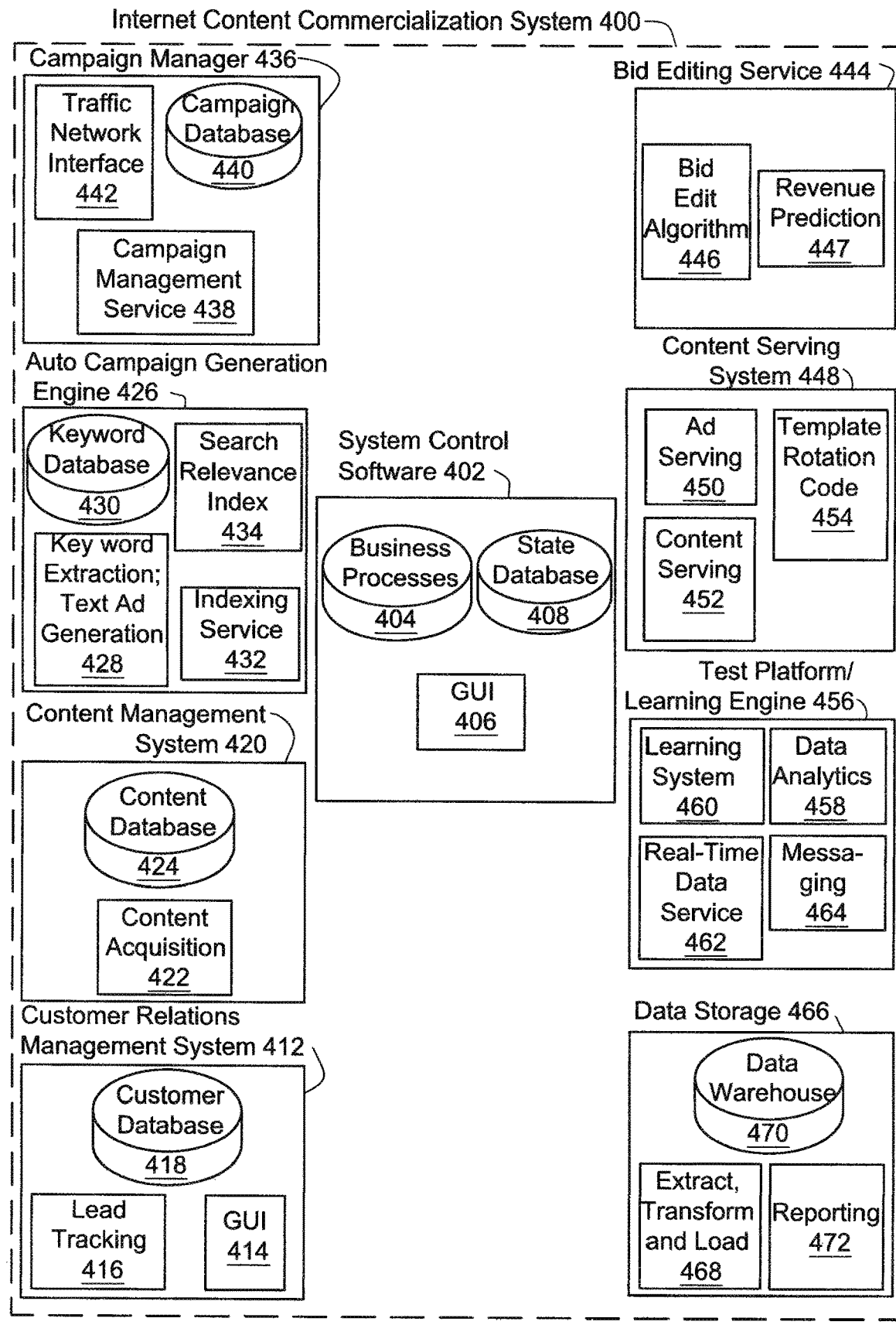
FIG. 4 is a block diagram of commercialization process 400.

Referring now to FIG. 4, the key systems and components of Internet content commercialization system (ICCS) 400 are shown.

System control software 402 controls and directs the other systems and components of ICCS 400. A graphic user interface or GUI 406 enables a system administrator to control the system directly. A database of business processes 404 stores instructions for carrying out the various processes which the system can execute, such as those shown in FIG. 3. Database of business processes 404 also contains rules which govern how the system will respond to normal or exceptional situations. A state database 408 keeps track of how far ICCS 400 has advanced through certain business processes. For example, state database 408 might keep track of the progress toward commercializing article 18, for which key words have been extracted but not yet published to traffic partner 210.

Customer relations management system 412 enables commercialization service provider 208 to enter information regarding its customers and potential customers and to keep track of that information. Graphic user interface or GUI 414 software system may incorporate various portals which could a) allow a sales person to enter information about customers or potential customers, b) allow a customer to initiate the Internet content commercialization service independently, or c) allow publisher 202 to query ICCS 400 to find out how much revenue his content is generating. Lead tracking system 416 may enable a sales person to record his contacts with potential customers and the phases of the sales cycle. Customer database 418 stores the information about customers and potential customers.

Content management system 414 brings content from publisher 202 into ICCS 400.

Publisher 202 might send CSP 208 the universal resource locators (URLs, or web page addresses) for all the articles he wishes to commercialize. Content acquisition system 422 would then "scrape" the content from the web pages; e.g., it would copy the content from those web pages, parse it, and load it into content database 424.

Alternately, publisher 202 might send the content to CSP 208 in the form of an XML file or some other agreed-upon format, and/or provide addition related to file, such as XML tags or the like. In an automatic or self service arrangement, such files would preferably be in a form suitable for automatic scraping, that is, in a form that CSP 208 could easily use to form CSP's web page 16.

The content may be in a proprietary format used only by publisher 202. If so, content acquisition system 422 would also translate the content into a format which ICCS 400 can read and implement.

Content database 424 stores not only the publisher's content but also metadata regarding the content. The term "metadata" refers to various attributes of the content, such as the topic, the author, and the publication date.

Auto campaign generation engine 426 automatically generates an ad campaign for each article or other unit of content in content database 424. The ad campaign consists of one or more key words, one or more text ads, and a bid for each key word or for the campaign as a whole.

The specific system responsible for creating the key words and the text ad is key word extraction/text ad generation system 428. Key word extraction/text ad generation system 428 might take into consideration some combination of the following features or other features as it automatically determines the best key word or key words:
  a) the term frequency, which may be a measure of the frequency with which various terms appear in the article.
  b) the inverse document frequency, which may be a measure of how unusual it is for the term to appear in other documents.
  c) the search frequency, which may be a measure of how often web searchers enter each candidate key word into the search engine web pages.
  d) the past experience of ICCS 400. In selecting a key word for an article, key word abstraction/text ad generation system 428 could consider which key words have successfully driven traffic to articles and generated profits for publishers in the past. ICCS 400 may also consider which key words have succeeded in the past with the particular traffic partner 210 to which it will offer a bid.

To identify the best key word or key words for each article on the basis of all these issues, key word extraction/text ad generation system 428 could employ an algorithm and/or a neural network. An algorithm within key word extraction/text ad generation system 428 generates ad 10 preferably in the form of text ads. Key word extraction/text ad generation system 428 may also query traffic partner 210 to learn how often web searchers 206 search on a given key word and how many other entities bid on that key word or other relevant available information.

Keyword database 430 stores information about the key word or key words assigned to each article.

Indexing service 432 indexes the content in content database 424. Indexing is a process of structuring data to make retrieval computationally efficient. Indexing service 432 might rely on Lucene and/or SoLR, two open-source tools that build a reverse index. A reverse index enables keyword database 430 to identify quickly all the articles that contain a given key word.

Search relevance index 434 provides information on the term frequency and inverse document frequency needed to calculate the appropriateness of the key word for a given content.

Campaign manager 436 stores, manages, and publishes the ad campaigns which may include one or more text ads, one or more key words, and a bid for each keyword or the entire campaign created by auto campaign generation engine 426.

Campaign database 440 stores the ad campaigns. Campaign manager 436 may also contain an interface which synchronizes campaign database 440 with a database maintained by traffic partner 210.

Campaign management service 438 enables ICCS 400 or a system administrator to create, read, update, or delete records in campaign database 440.

Traffic network interface 442 publishes ad campaigns to traffic partner 210.

Bid editing service 444 determines whether and how to revise the bid to traffic partner 210 in order to maximize the profitability of each article. Bid edit algorithm 446 calculates the optimal bid on the basis of several factors, such as the revenue per visit to web page 16, the traffic partner 210, the revenue associated with each key word, and the revenue associated with each text ad. Different key words and different text ads will generate different amounts of revenue, and the revenue may also depend on the traffic partner 210. Bid edit algorithm 446 may take all these and similar factors into consideration.

Revenue prediction system 447 calculates a numerical score for each key word, or for each article, or both. The numerical score indicates the likelihood that the content can generate a profit. If the score is below a certain threshold, ICCS 400 may not make or discontinue making efforts to commercialize the content. If the score matches or exceeds the threshold value, ICCS 400 may attempt to commercialize the content. To calculate the numerical score, revenue prediction system 447 may rely on criteria such as term frequency, inverse document frequency, and search frequency, as well as other information from search relevance index 434. System 447 may also take into consideration the previous profit or loss of similar contents or key words.

Content serving system 448 may determine which template, which content, how many advertisements, and which advertisements to serve on web page 16, then serves web page 16 to web searcher 206. The selected template may include a combination of design features such as type face, type size, background color, number of advertisements, etc.

Ad serving system 450 may determine which advertisement 20 or advertisements to place on web page 16. For example, ad serving system 450 may provide code from a revenue partner 212 which instructs the web browser software of web searcher 206 to draw advertisement 20 from a server maintained by revenue partner 212, which may be an advertising network or a third-party advertiser.

Content serving system 452 may read the appropriate content from content database 420. Content serving system 452 may contain content rendering code which translates the content into hypertext markup language (HTML), which may be used to tell the web browser software of web searcher 206 how the page should look when displayed.

Template rotation code 454 may display the template selected by test platform/learning engine 456, which selects a template from two or more choices as part of an experiment to determine which template generates the most revenue for a given key word or a given article 18.

Test platform/learning engine 456 may help ICCS 440 to maximize profits for CSP 208 and publisher 202 by optimizing the design, the bid, or the ad campaign for a given article. Test platform/learning engine 456 may also help in the selection of template parameters, advertisements, etc. by determining 1) whether additional data needs to be collected for one or more attributes of a current visit or 2) whether a particular template, ad network, advertisement, etc. can maximize the revenue potential of a visitor to the CSP web page 16.

Real-time data service 462 may capture information regarding many or all the events which occur on CSP web page 16, such as the number of times a web searcher 206 comes to CSP web page 16 from a particular search engine web page 2, the number of times a particular web searcher 206 clicks on link 22 to third-party advertiser's web page 24, etc. Real-time data service 462 may store all this information in data warehouse 466.

Data analytics system 458 may correlate real-time data with information from traffic partner 210 regarding which key word and which text ad 10 web searcher 206 clicked on in order to move from search engine web page 2 to CSP web page 16. Multiple text ads 10 may include link 12 in order to determine the effectiveness of each of the text ads 10. Data analytics system 458 sorts all this information in ways that enable other systems within ICCS 400 to act on it. Data analytics system 458 also looks for exceptional events, such as problems or opportunities which might require ICCS 400 to adjust automatically (for example, by amending or withdrawing a bid) or might require the invention of a human operator.

Learning system 460 may analyze historical data to determine which tactics optimize the profitability of article 18. Learning system 460 may consider parameters such as the key words, text ad 10, traffic partner 210, the template, the number of advertisements 20 on CSP web page 16, etc., in order to identify a combination of factors which optimize the probability that web searcher 206 will click on link 22 to third-party advertiser's web page 24. Learning system 460 may also identify data it needs in order to specify such a combination of factors and instruct content serving system 448 to gather those data. For example, learning system 460 might instruct template rotation code 454 to experiment with a given template or instruct ad serving system 450 to display more or fewer advertisements.

Messaging system 464 sends messages from various systems, such as the learning system 460 to other systems throughout ICCS 400.

Data storage system 466 acquires, stores, and reports data regarding ICCS 400 system performance.

Data warehouse 470 may be a specialized form of database optimized for analysis. Data warehouse 470 stores information from real-time data service 462, data analytics system 458, and learning system 460. Data warehouse 470 may also store historical information about costs and revenue. Data warehouse 470 may provide key information for bid editing service 444 and learning system 460.

Extract, transform and load system 468 may collect data from real-time data service 462, data analytics system 458, and learning system 460, transforms those data to match the data structure of data warehouse 460 and loads those data into data warehouse 460.

Reporting system 472 may compile "canned" reports with pre-designed formats and contents. These reports might indicate how much money ICCS 400 is making for each web page. Canned reports might also help bid editing service 444 and system administrators to understand the costs and revenues associated with specific key words.

Reporting system 472 may also compile "ad hoc" reports to answer a specific question submitted by a system administrator. For example, a system administrator might want to know whether web searchers from one traffic partner were more likely to click on link 22 than web searchers from another traffic partner.

I.D Internal System Messages

Referring now generally to FIGS. 5-12, the primary messages passed internally within an exemplar of ICCS 400 are illustrated.

Figure 5:
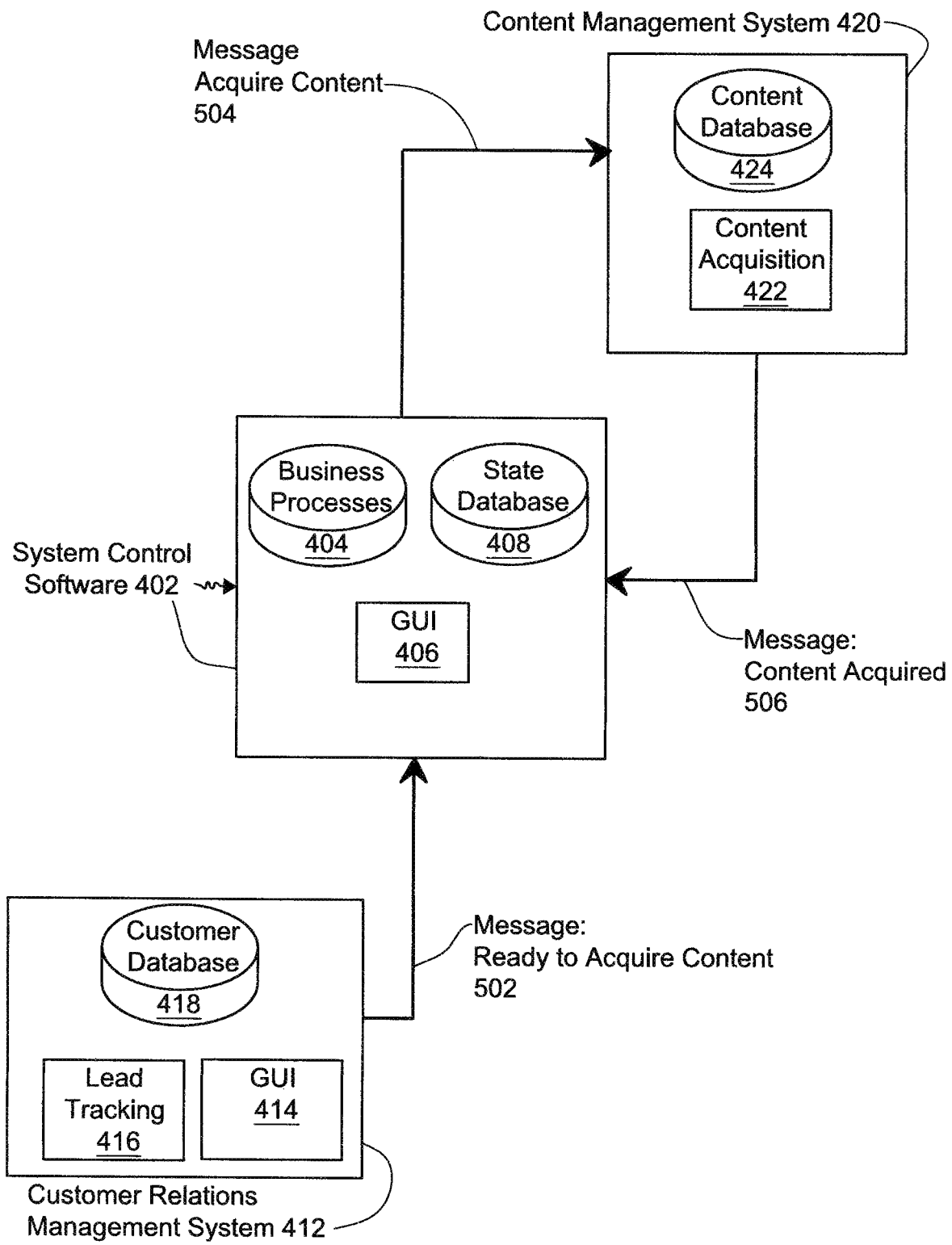
FIG. 5 is a block diagram of the flow of messaged between system control software 402, customer relations management system 412 and content management system 420.

Referring now to FIG. 5, the following messages may be exchanged between system control software 402, customer relations management system 412 and content management system 420.

Ready to acquire content 502. Customer relations management system 412 may notify system control software 402 that system 412 is ready to acquire content from a publisher; e.g., that publisher 202 has concluded an agreement with commercialization service provider 208.

Acquire content 504. System control software 402 may also send content management system 420 a command to acquire content from a given publisher 202.

Content acquired 506. Content management system 420 confirms to system control software 402 that it has acquired content from publisher 202.

Figure 6:
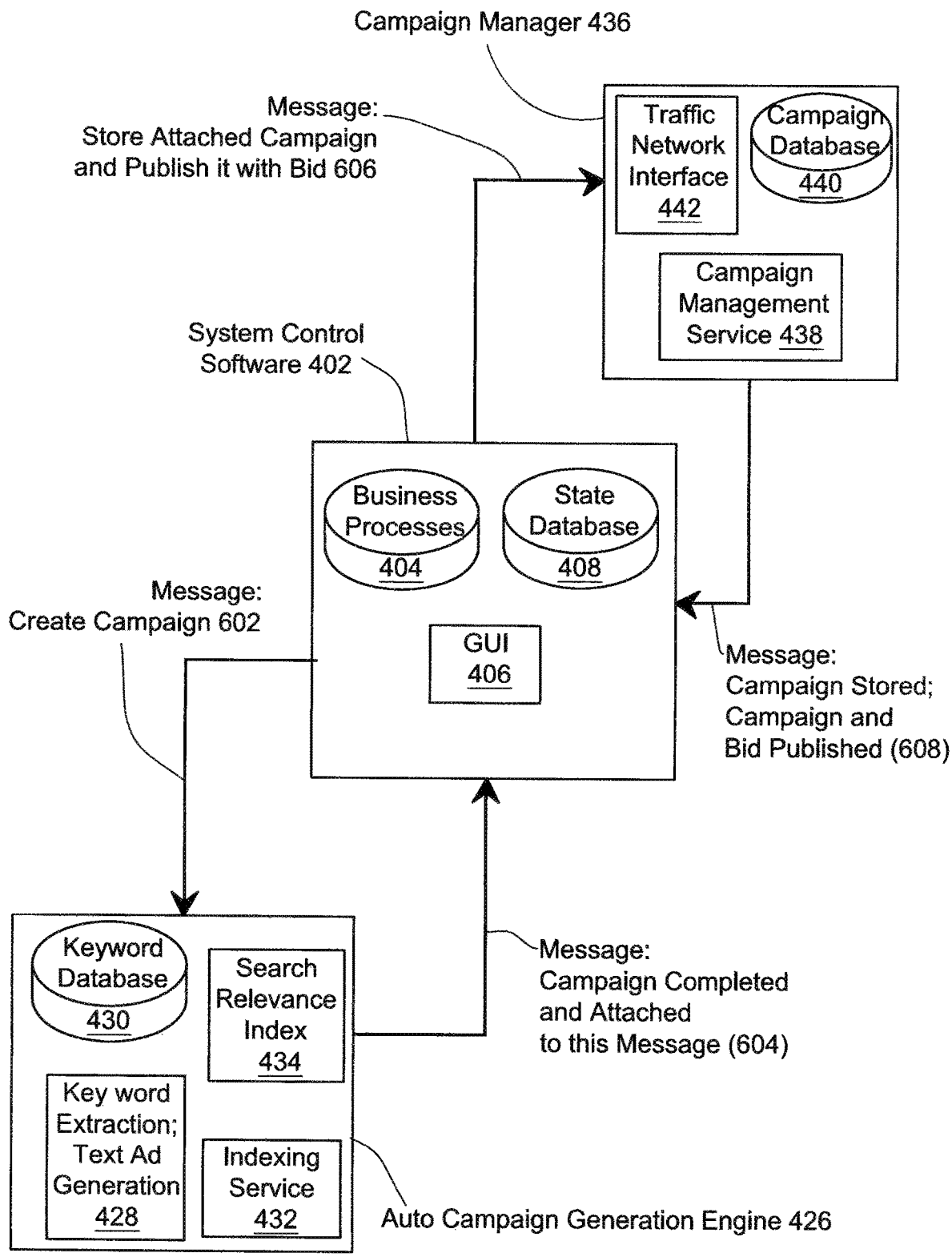
FIG. 6 illustrates messages may be exchanged between system control software 402, auto campaign generation engine 426 and campaign manager 436.

Referring now to FIG. 6 illustrates messages may be exchanged between system control software 402, auto campaign generation engine 426 and campaign manager 436:

Create campaign 602. System control software 402 may command auto campaign generation engine 426 to create a campaign for a given body of content.

Campaign completed and attached to this message 604. Auto campaign generation engine 426 confirms to system control software 402 that engine 426 has created the campaign and is sending the campaign to system control software 402.

Store attached campaign and publish it with bid 606. System control software 402 may command campaign manager 436 to store the campaign in campaign database 440 and to publish the campaign to traffic partner 210 via traffic network interface 442.

Campaign stored; campaign and bid published 608. Campaign manager 436 confirms to system control software 402 that it has stored the campaign in campaign database 440 and published the campaign with the bid to traffic partner 210 via traffic network interface 442.

Figure 7:
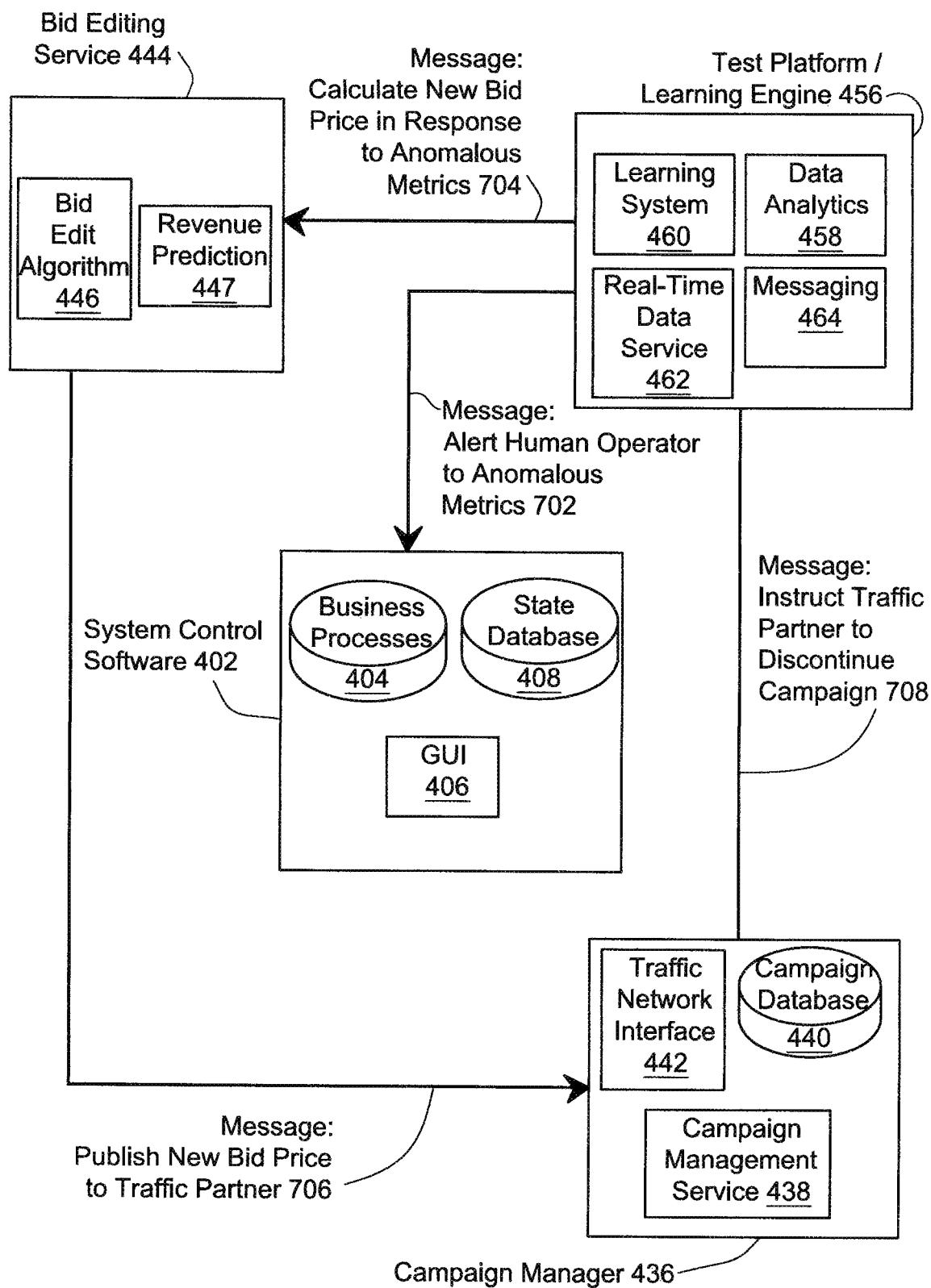
FIG. 7 illustrates messages that flow among system control software 402, bid editing service 444, test platform/learning engine 456, and campaign manager 436.

Referring now to FIG. 7, messages that flow among system control software 402, bid editing service 444, test platform/learning engine 456, and campaign manager 436 are illustrated.

Alert human operator to anomalous metrics 702. Test platform/learning engine 456 may command system control software 402 to issue a warning that exceptional circumstances may require the attention of a human operator.

Calculate new bid price in response to anomalous metrics 704. Test platform/learning engine 456 may command bid editing service 444 to recalculate a bid.

Publish new bid price to traffic partner 706. Bid editing service 444 may command campaign manager 436 to publish a new bid price to traffic partner 210.

Instruct traffic partner to discontinue campaign 708. Test platform/learning engine 456 may command campaign manager 436 to instruct traffic partner 210 to stop directing traffic to CSP's page 16. The most common reason for issuing this command would be that data analytics system 458 discovered that a given article 18 is losing money.

Figure 8:
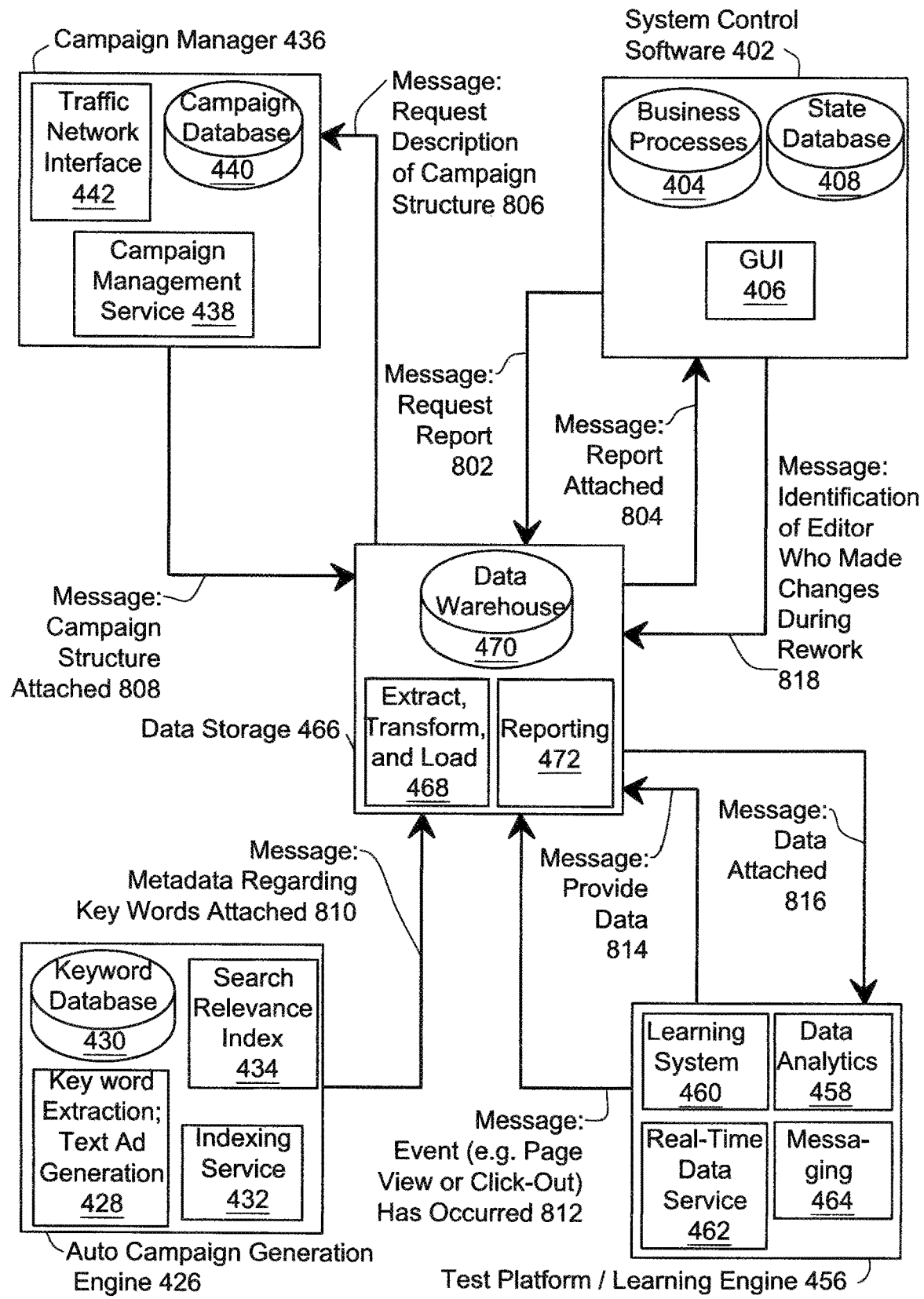
FIG. 8 illustrates messages that data storage system 466 exchanges with auto campaign generation engine 426, campaign manager 436, system control software 402, and test platform/learning engine 456.

Referring now to FIG. 8, messages that data storage system 466 exchanges with auto campaign generation engine 426, campaign manager 436, system control software 402, and test platform/learning engine 456 are shown.

Request report 802. System control software 402 may request that data storage system 466 provide a report. The report could be either a canned report or an ad hoc report. System control software 402 could request a canned report either automatically or in response to a specific request issued by a system operator at GUI 406.

Report attached 804. Data storage system 466 may confirm to system control software 402 that it has compiled the requested report and attached it to this message.

Request description of campaign structure 806. Data storage system 466 may command campaign manager 436 to send a description of the campaign structure to system 466. The campaign structure may consist of a hierarchical description of the articles, key words, and text ads relevant to a specific publisher. This information may enable the reporting system 472 to create reports on the activities and financial data relevant to that publisher.

Campaign structure attached 808. Campaign manager 436 confirms to data storage system 466 that the requested campaign structure is attached to this message.

Metadata regarding key words attached 810. Auto campaign generation engine 426 may send metadata to data storage system 466 regarding the key words stored in the key word database 430. The metadata might include the number of words which constitute the key word, the number of advertisers bidding on the key word, and/or the frequency with which web searchers 206 use a particular key word in a search query. Extract, transform and load system 468 may load the metadata into data warehouse 466. The metadata may contribute to the numerical score which ICCS 400 assigns to each key word.

Event (e.g. page view or click-out) has occurred 812. Test platform/learning engine 456 may notify data storage system 466 that an event has occurred. For example, web searcher 206 might have viewed web page 16 or clicked on link 22. Extract, transform, and load system 468 will insert that information into data warehouse 470. Reporting system 472 will require this information to prepare reports which specify, for example, how much money a given article 18 is earning.

Provide data 814. Test platform/learning engine 456 may request data from data storage system 466. For example, learning system 460 may require data from data warehouse 470 to inform a decision learning system 460 makes about what additional data may be needed or which ad 20 or template may be used to display content 18 to a web searcher 260.

Data attached 816. Data storage system 466 may announce to test platform/learning engine 456 that engine 456 is providing the requested data.

Identification of editor who made changes during rework 818. When a human editor is employed by CSP 208 to make changes to text ad 10, or a key word, through GUI 406, system control software 402 notifies data storage system 466 about which editor made which changes to enable reporting system 472 to report for example on the effectiveness or other characteristic of each editor.

Figure 9:
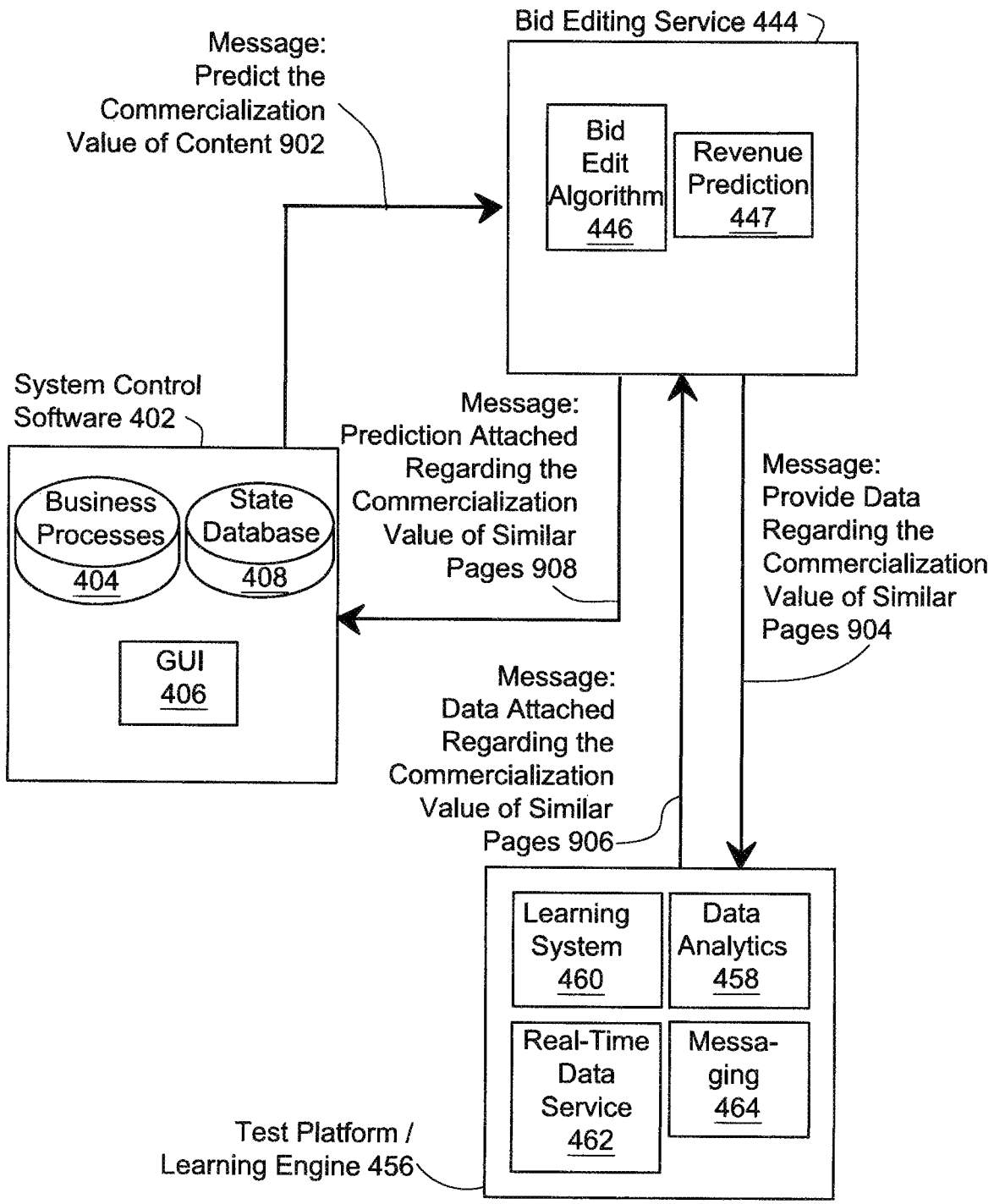
FIG. 9 shows messages which bid editing service 444 may exchange with system control software 402 and/or test platform/learning engine 456.

Referring now to FIG. 9, messages are shown which bid editing service 444 may exchange with system control software 402 and/or test platform/learning engine 456.

Predict the commercialization value of content 902. System control software 402 commands bid editing service 444 to predict the commercialization value of an article or other content 18.

Provide data regarding the commercialization value of similar pages 904. Before responding to message 902, bid editing service 444 may command test platform/learning engine 456 to provide data regarding the commercialization value of pages similar to the page referenced in message 902.

Data attached regarding the commercialization value of similar pages 906. Test platform/learning engine may send to bid editing service 444 the requested data regarding the commercialization value of content similar to the content referenced in message 902.

Prediction attached regarding the commercialization value of said page 908. Bid editing service 444 may respond to message 902 by sending to system control software 402 the predicted value of the content referenced in message 902.

Figure 10:
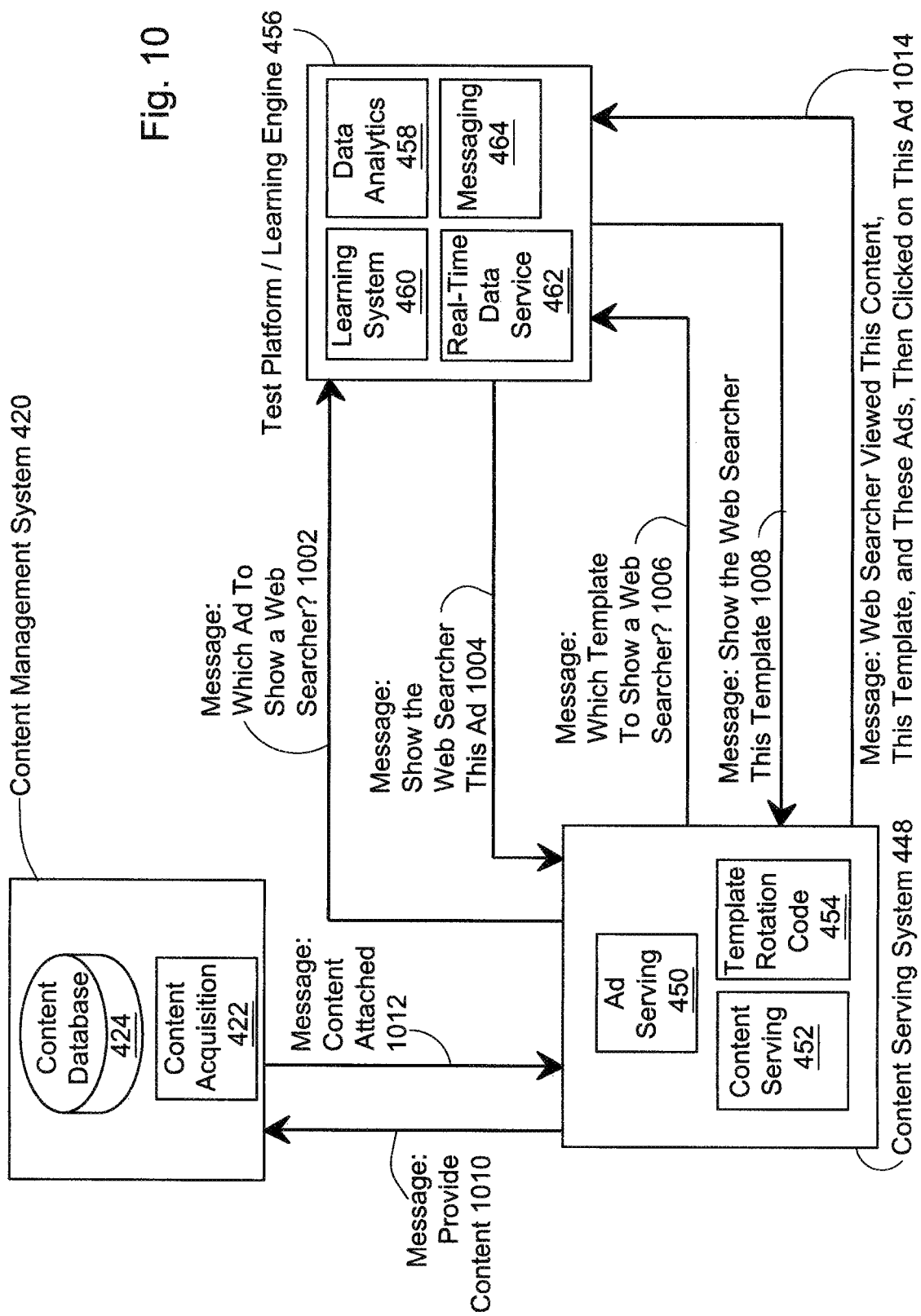
FIG. 10 illustrates exemplar messages which content serving system 448 exchanges with content management system 420 and test platform/learning engine 456.

Referring now to FIG. 10, exemplar messages which content serving system 448 exchanges with content management system 420 and test platform/learning engine 456 are shown.

Which ad to show a web searcher 1002? Content serving system 448 may ask test platform/learning engine 456 which ad 10 to display along with a given article for a web searcher 206 from a given search engine web page 2.

Show the web searcher this ad 1004. Test platform/learning engine 456 may respond to message 1002 by telling content serving system 448 which ad 10 to display. Learning system 460 may select the ad 10 which web searchers who arrived at web page 16 from a given search engine web page 2 are most likely to click on, based on historical data.

Which template to show a web searcher 1006? Content serving system 448 may ask test platform/learning engine 456 which template to select while displaying a given article to a web searcher 206 from a given search engine web page 2.

Show the web searcher this template 1008. Test platform/learning engine 456 may respond to message 1008 by telling content serving system 448 which template to display. Learning system 460 may select the template which apparently induced the highest percentage of web searchers 206 who arrived at web page 16 from a given search engine web page 2 to click on link 22 to third-party advertiser's web page 24, based on historical data. Learning system 460 can also select the template on the basis of other factors such as the key word, the time of day, the day of the week, the traffic net work, and/or the text ad 10. Learning system 460 may also select the template on the basis of what data it needs to acquire; in this case, it may sacrifice potential short-term profit in order to make better decisions in the future or make a temporary decision which can be optimized later.

Provide content 1010. Content serving system 448 commands content management system 420 to provide the appropriate content from content database 420 so that content serving system 448 can provide that content, e.g. CSP web page 16, to a web searcher 206 who visited search engine web page 2 and clicked on link 12.

Content attached 1012. Content management system 420 responds to content serving system 448 by saying that system 420 is providing the content requested by message 1010.

Web searcher viewed this content, this template, and these ads, then clicked on this ad 1014. Content serving system 448 automatically sends notification of events to test platform/learning engine 456 for use by real-time data service 462.

Figure 11:
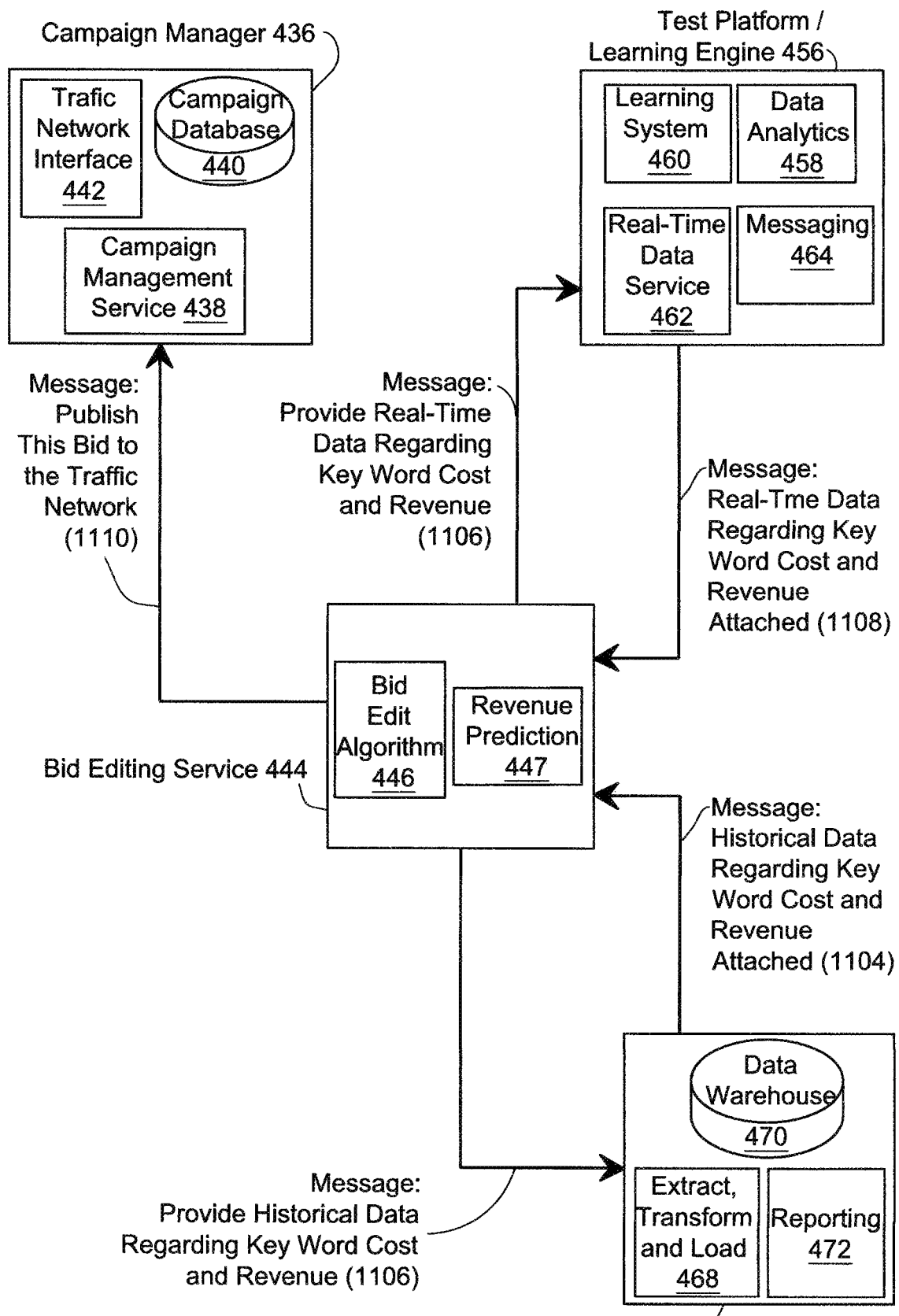
FIG. 11 illustrates messages which bid editing service 444 exchanges with campaign manager 436, test platform/learning engine 456, and data storage system 466.

Referring now to FIG. 11, messages are shown which bid editing service 444 exchanges with campaign manager 436, test platform/learning engine 456, and data storage system 466.

Provide historical data regarding key word cost and revenue 1102. Bid editing service 444 commands data storage system 466 to send historical data regarding the costs and revenue associated with a given key word. This information can help revenue prediction system 447 to predict the revenue for a key word or help bid edit algorithm 446 to calculate a bid which maximizes profits.

Historical data regarding key word cost and revenue attached 1104. Data storage system 466 responds to message 1102 by sending the requested historical key word cost and revenue from data warehouse 470.

Provide real-time data regarding key word cost and revenue 1106. Bid editing service 444 commands test platform/learning engine 456 to send real-time data regarding the costs and revenue associated with a given key word.

Real-time data regarding key word cost and revenue attached 1104. Test platform/learning engine 456 responds to message 1106 by sending the requested real-time key word cost and revenue information from real-time data service 462.

Publish this bid to the traffic network 1110. Bid editing service 444 commands campaign manager 436 to publish a bid calculated by bid edit algorithm 446 to one or more traffic partners 210 through traffic network interface 442.

Figure 12:
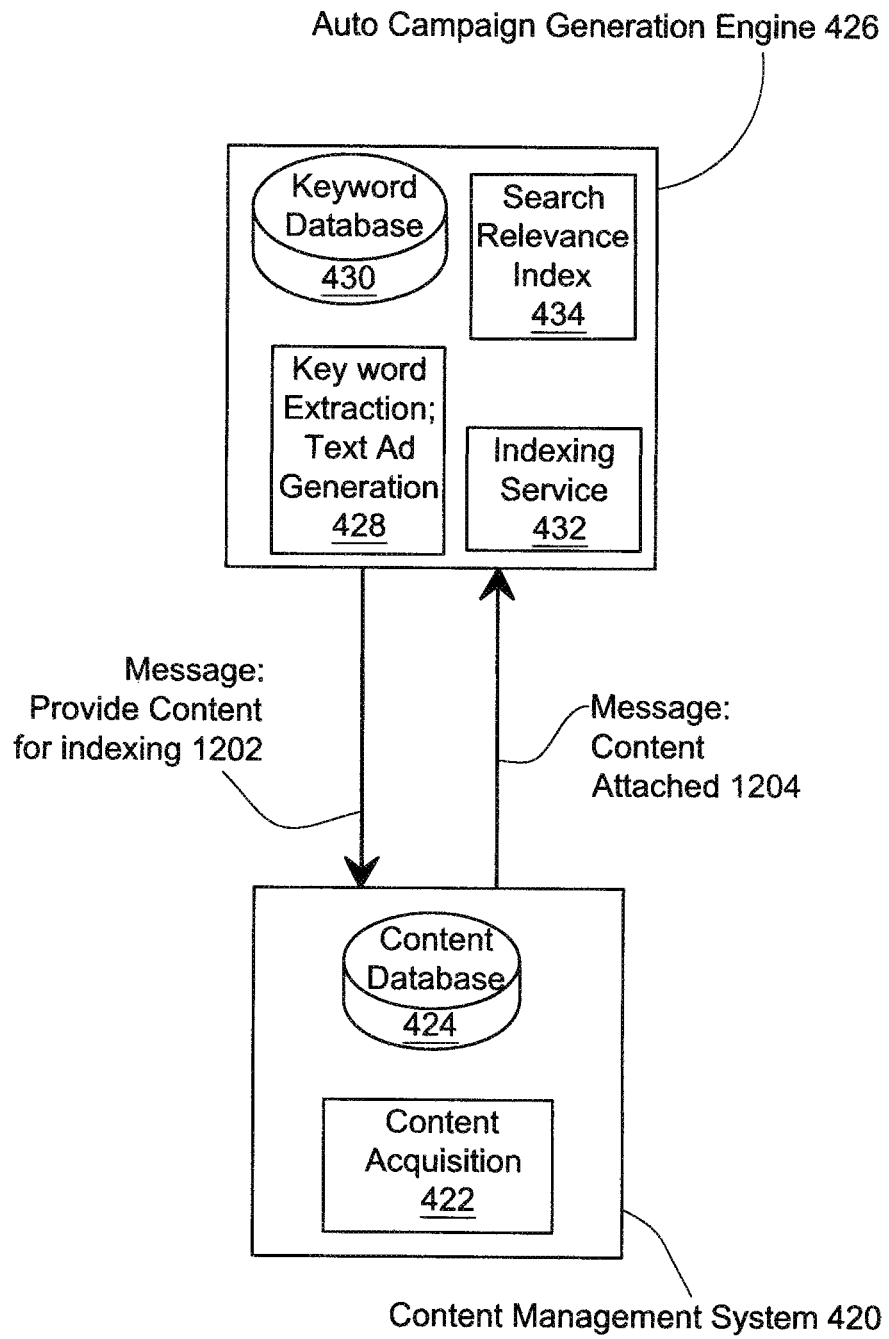
FIG. 12 shows messages exchanged by auto campaign generation engine 426 and content management system 420.

Referring now to FIG. 12, messages exchanged by auto campaign generation engine 426 and content management system 420 are shown.

Provide content for indexing 1202. Auto campaign generation engine 426 commands content management system 420 to provide content for key word extraction and indexing.

Content attached 1204. Content management system 420 responds to message 1202 by sending the requested content to auto campaign generation engine 426.

I.E System Interactions with External Entities

Referring now generally to FIGS. 13-18, some of the more important interactions between ICCS 400 and various external entities are illustrated.

Figure 13:
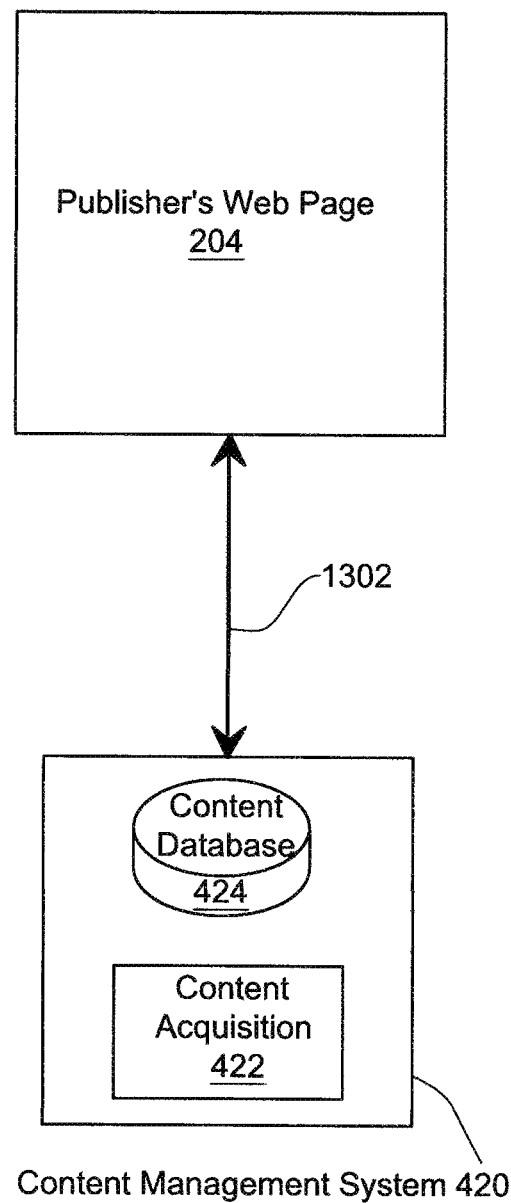
FIGS. 13-18 illustrate interactions between ICCS 400 and various external entities.

Content acquisition component acquires content from publisher's web page 1302. FIG. 13 illustrates that content management system 420 acquires content from publisher's web page 204.

Figure 14:
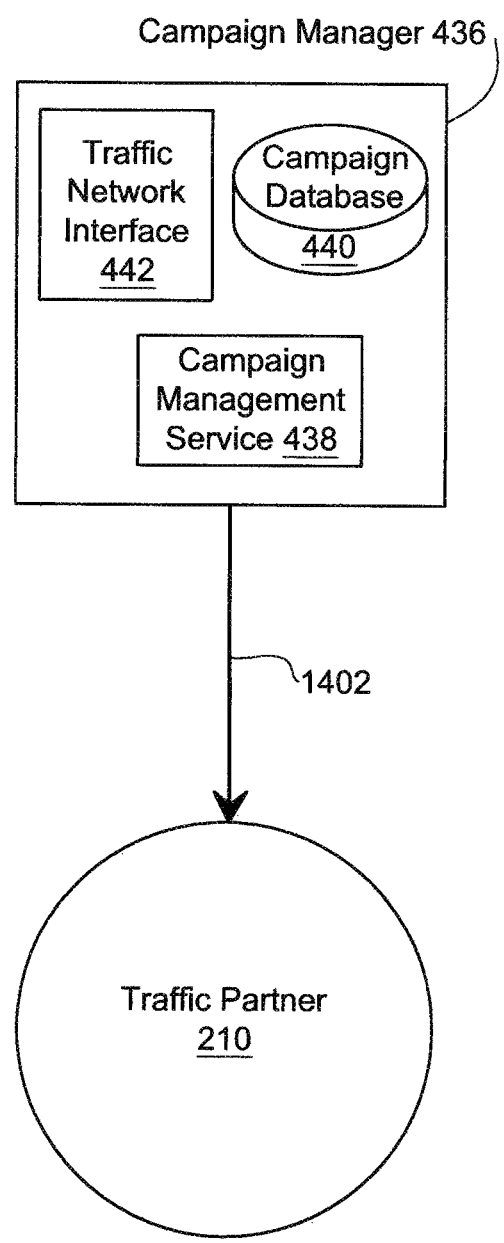

Traffic network interface publishes ad campaign to traffic partner 1402. FIG. 14 illustrates that campaign manager 436 publishes an ad campaign to a traffic partner 210 through the traffic network interface 442.

Figure 15:
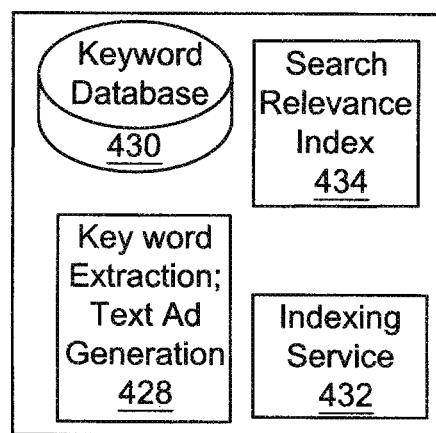
Figure 15:
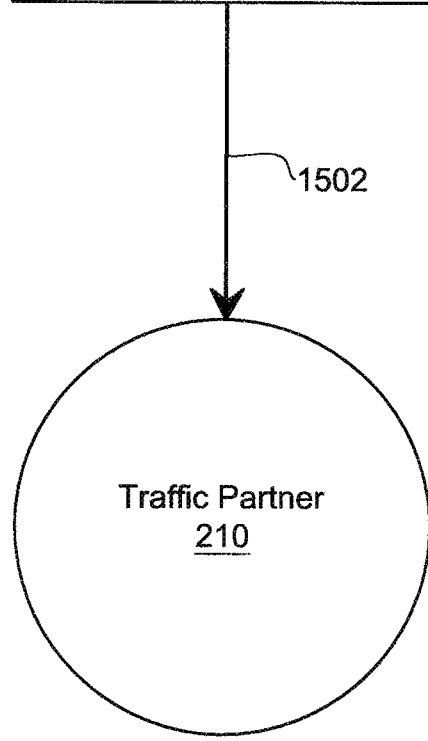

Key word extraction; text ad generation queries traffic partner or another entity to learn how often web searchers search on a given key word and how many entities bid on that key word 1502. FIG. 15 illustrates that auto campaign generation engine 426 asks traffic partner 210 or another entity how often web searchers 206 search on a given key word and how many entities are bidding on that key word.

Figure 16:
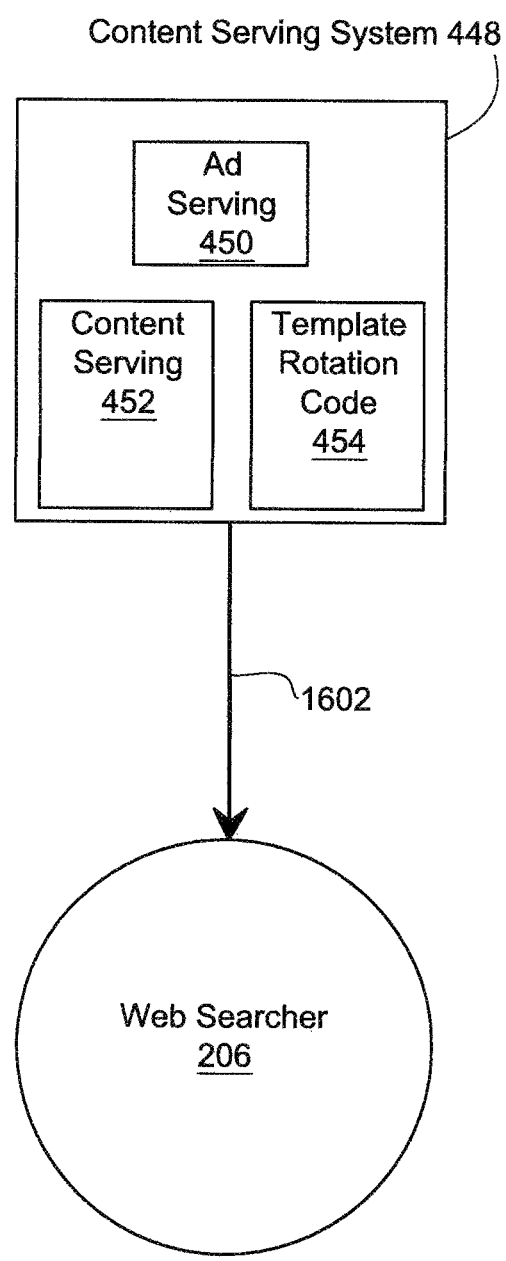

Content serving system serves template, content, and ad to web searcher 1602. FIG. 16 illustrates how content serving system 448 serves template, content, and ad to web searcher 206.

Figure 17:
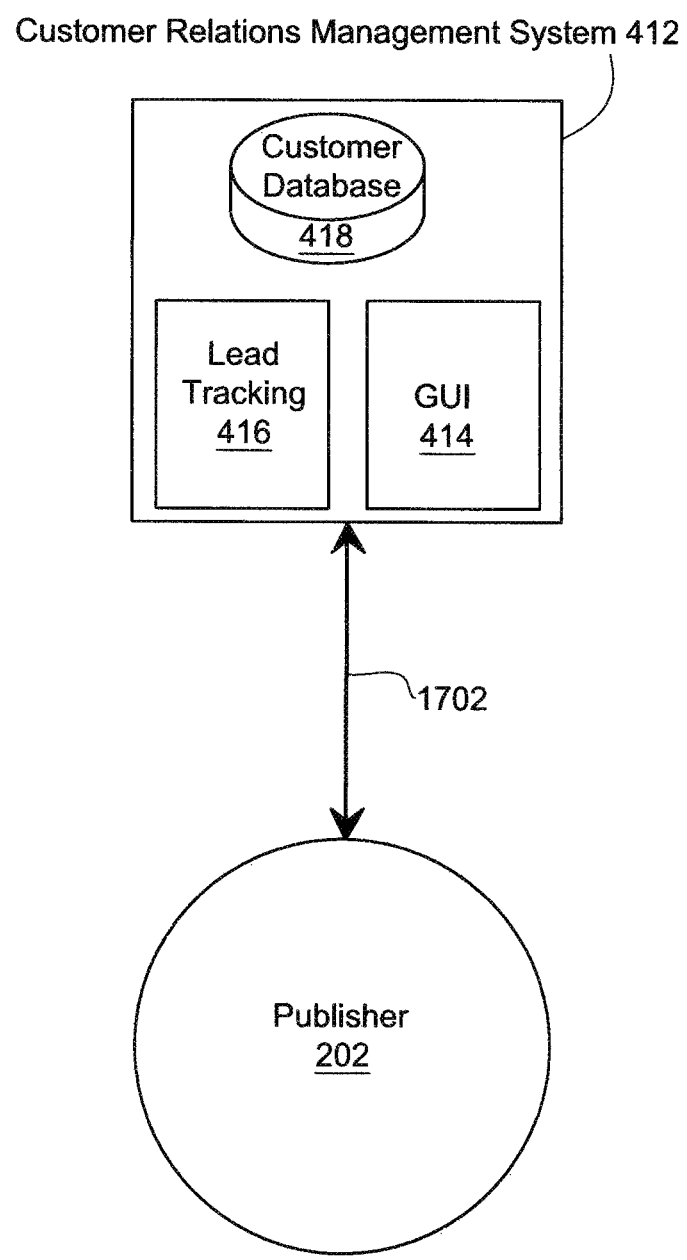

Publisher queries GUI of customer relations management system to gather relevant financial data 1702. FIG. 17 shows that publisher 202 can query GUI 414 of customer relations management system 412 to gather relevant financial data, such as the amount of revenue his content is generating.

Figure 18:
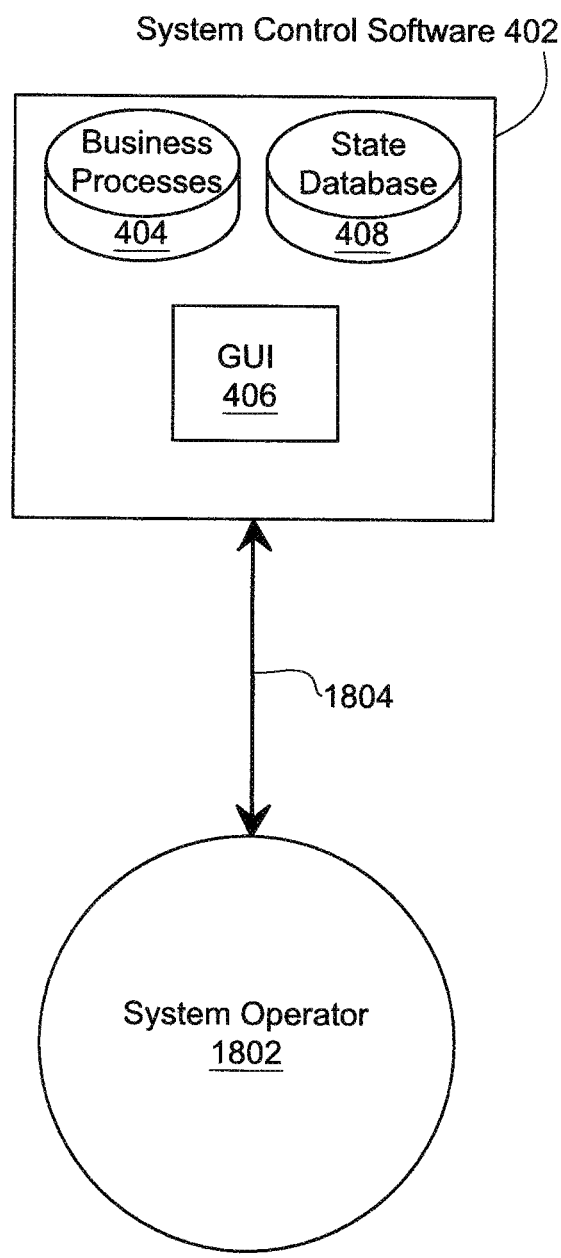

System operator operates Internet Content Commercialization System through GUI of system control software 1804. FIG. 18 shows that a system operator 1802 can operate ICCS 400 through GUI 406 of system control software 402.

I.F Automated Search Engine Marketing Services

Figure 19:
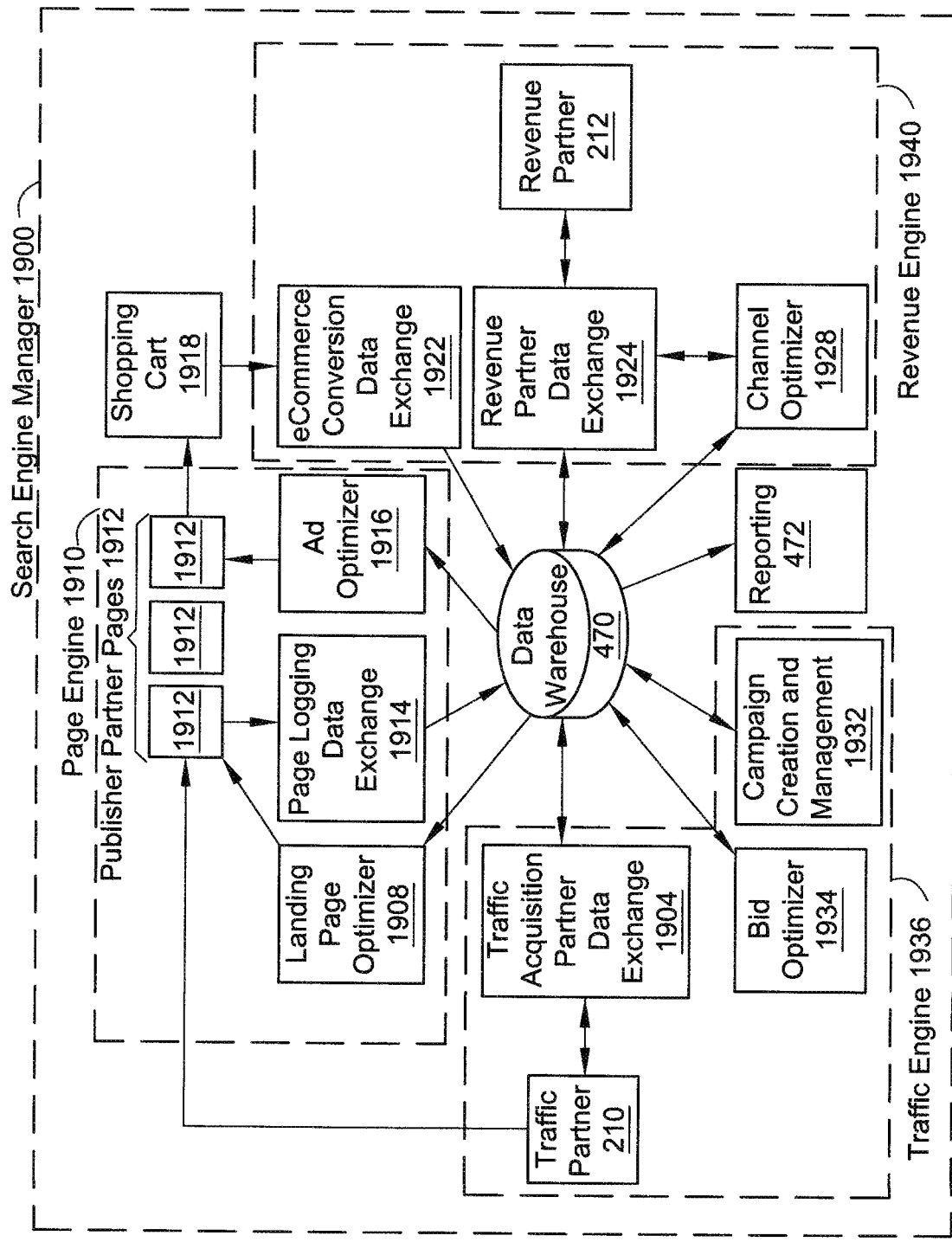
FIG. 19 is a block diagram of search engine manager 1900.

Referring now to FIG. 19, in an alternate embodiment, search engine manager 1900 provides automated search engine marketing services. These services allow publishers to make incremental revenues from their content by purchasing traffic from search engines and other traffic partners, directing the traffic to pages containing the publisher's content and optimizing the performance of those pages to maximize revenue from each visitor. Search engine manager 1900 automatically maximizes the cash flow and/or gross margin produced by the publishers' pages by adjusting the amount spent with each traffic partner in accordance with calculated algorithms using a closed loop feedback system.

The major three groups of subsystems are traffic engine 1936, page engine 1910, and revenue engine 1940. Traffic engine 1936 drives Internet traffic to publisher partner's pages 1912. Traffic engine 1936 includes the following entities:

traffic partner 210.

traffic acquisition partner data exchange 1904, the software interface between search engine manager 1900 and the computer system operated by traffic partner 210.

bid optimizer 1934, a bid editing algorithm that sets appropriate bids for ad campaigns.

campaign creation and management 1932, which performs the functions of auto campaign generation engine 426 as shown in FIG. 4.

Page engine 1910 displays publisher partner's pages 1912. Page engine 1910 includes the following entities:

landing page optimizer 1908, which performs the functions of test platform/learning engine 456 in FIG. 4.

page logging/data exchange 1914, which records events such as a web searcher 206 arriving at publisher partner pages 1912 or clicking on an advertisement on those pages.

ad optimizer 1916, which selects the advertisements to place in the appropriate position on publisher partner pages 1912.

Revenue engine 1940 implements interaction of search engine manager 1900 with revenue partner 212 and includes:

eCommerce conversion data exchange 1922, a software interface to shopping cart 1918 of traffic partner 210 when traffic partner 210 is an eCommerce company. eCommerce conversion data exchange 1922 allows search engine manager 1900 to track purchases made by web searchers.

revenue partner data exchange 1924, a software interface which enables search engine manager 1900 to exchange financial information with revenue partner 212.

channel optimizer 1928, which assigns publisher partner pages 1912 to a given reporting channel. Certain revenue partners 212, such as Google, don't necessarily report on the performance (for example, number of click-ins, click-outs, etc.) for each page. Such revenue partners report aggregate data for as many as 200 reporting channels, or groups of pages. If publisher partner pages 1912 number more than the number of available channels, e.g. 200, revenue partner 212 may report aggregate data describing the performance of multiple publisher partner pages 1912 in at least one reporting channel. Channel optimizer 1928 enables search engine manager 1900 to determine the performance of a given page by isolating that page as the only entity within a particular reporting channel.

Referring now to FIGS. 20 through 28, the steps in the internet content commercialization process executed by search engine manager 1900 are described.

Step 1: Customer Sign-Up and Campaign Creation

Figure 20:
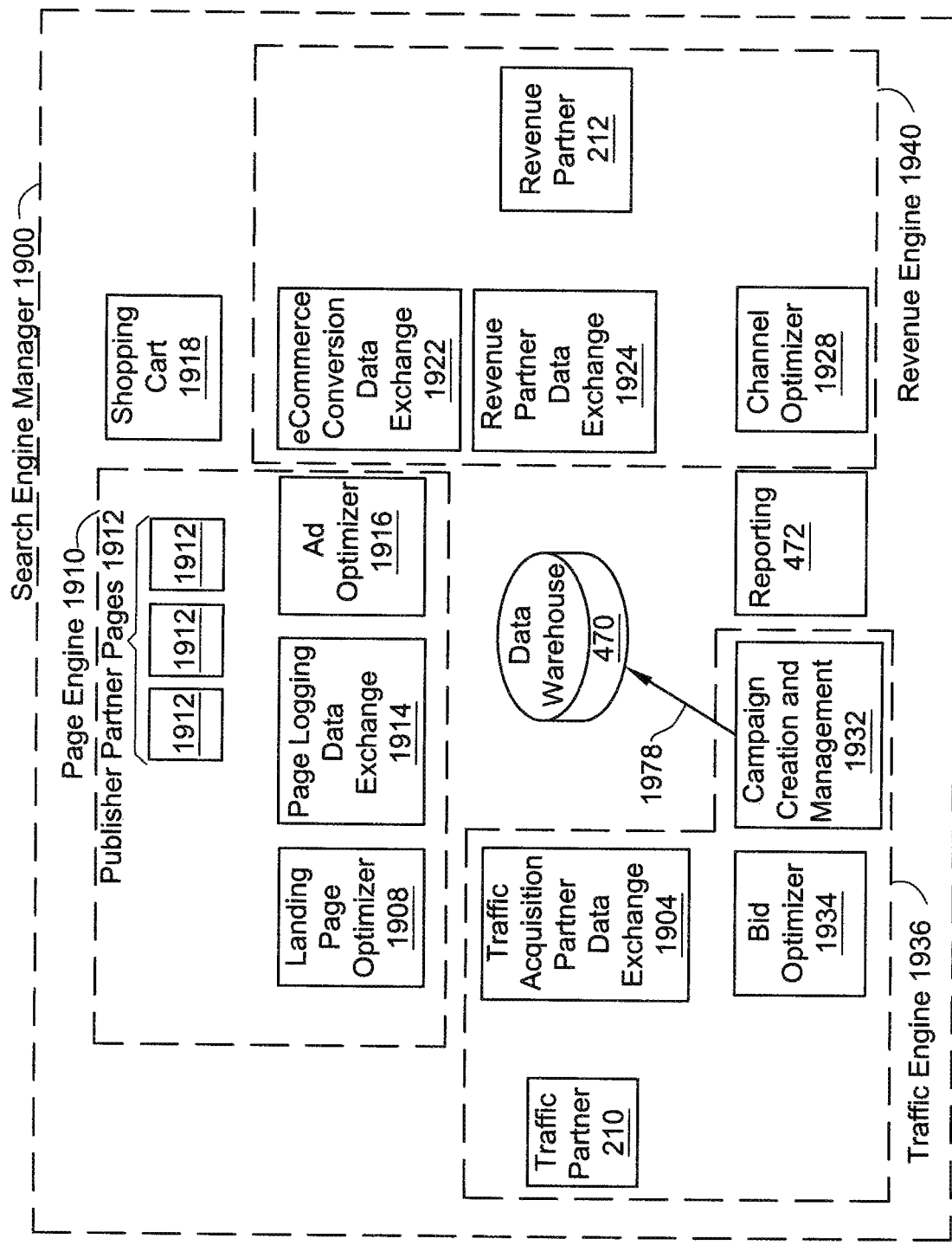
FIGS. 20-28 illustrate the steps in the internet content commercialization process executed by search engine manager 1900.

Referring now to FIG. 20, the first step of the search engine manager process begins when the customer signs up for service as illustrated by step 1978 in which campaign creation and management 1932 is connected to data warehouse 470. Once the customer has signed up for service, web pages that contain the customer's content are created based on templates, publisher partner pages 1912 and marketing campaigns are created by campaign creation & management 1932 module of traffic engine 1936 at each partner site that will be used to drive traffic to the pages. Each campaign includes specific keywords that are relevant to publisher partner pages 1912, as well as text and/or graphical ads that will be displayed when Web searchers enter those search phrases or key words at the traffic partner sites. (Alternatively, in the case of a contextual ad network such as Google's AdSense™ product, the text or graphical ads may show up on pages in the traffic partner's content distribution network that the traffic partner deems as relevant to those keywords.) Once these campaigns are created, initial bids are determined based on business rules established by search engine manager 1900.

Search engine manager 1900 may allow the sign-up process to occur in an automated fashion. The customer comes to the CSP website, signs up for service and a code block is automatically generated. By inserting this code block onto the web pages to which they want to have search engine manager 1900 drive traffic, the service is automatically activated. Search engine manager 1900 automatically reads the page, extracts the relevant content and other branding elements, places the content and branding elements on a template selected based on anticipated performance and begins driving traffic to this derivative page automatically. In addition, search engine manager 1900 may intelligently and automatically discern the meaning of the content on the page, select keywords relevant to that content and write relevant and compelling ads.

Step 2: Campaign Upload

Figure 21:
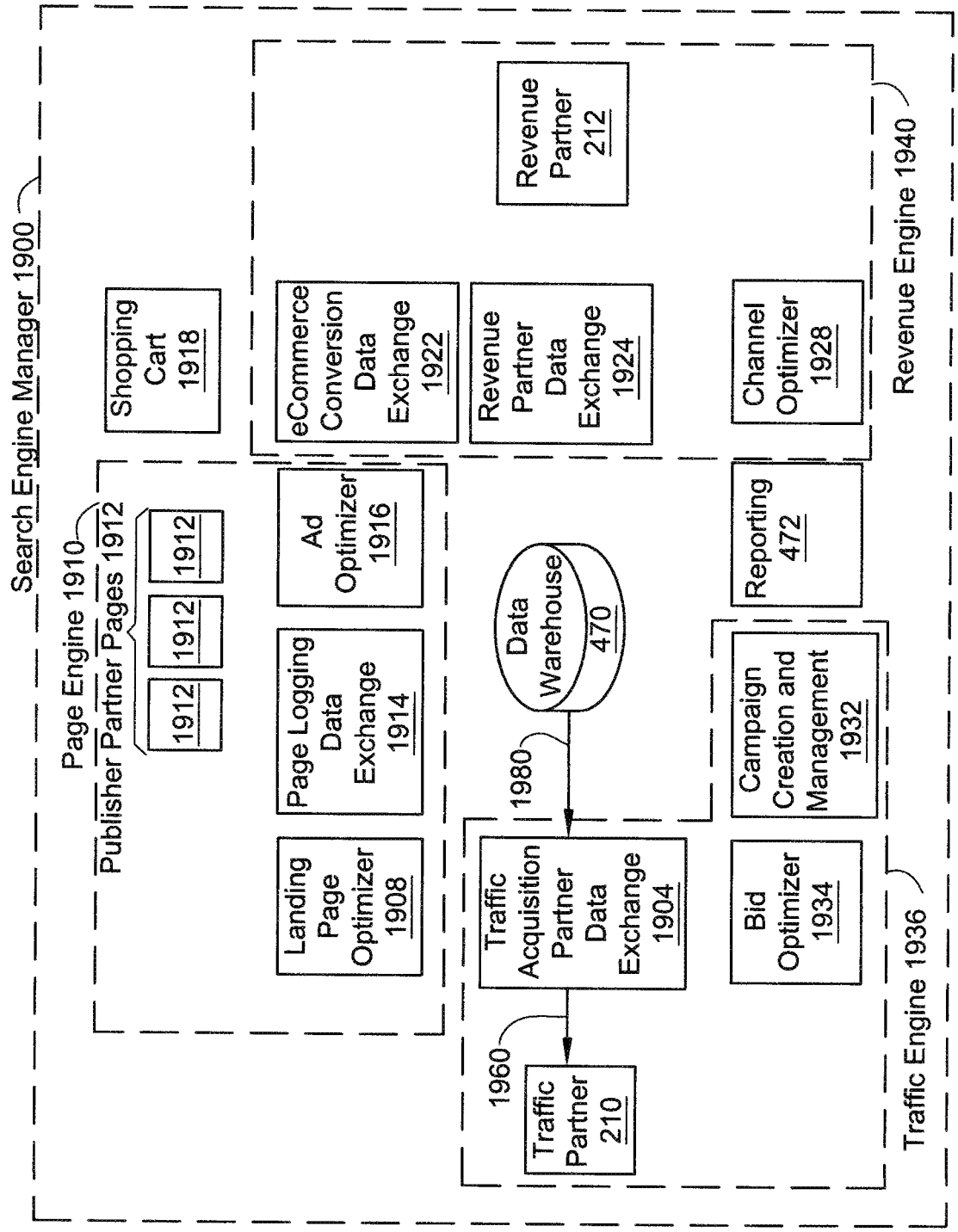

Referring now to FIG. 21, once publisher partner pages 1912 and the elements of the campaign (keywords, text ads and initial bids) have been created by search engine manager 1900, this information is transferred to the traffic partners via an application programmer's interface (API). Search engine manager 1900 has an automated interface with major traffic partners, thereby maximizing revenue generating opportunities. When all of the information has been transferred to the appropriate traffic partners, search engine manager 1900 turns the campaigns on to indicate to the traffic partners that they should begin to send traffic to publisher partner pages 1912 as illustrated by step 1980, which joins data warehouse 470 to traffic acquisition partner data exchange 1904, and by step 1960, which joins traffic acquisition partner 1904 to traffic partner 210.

Step 3: Driving Traffic

Figure 22:
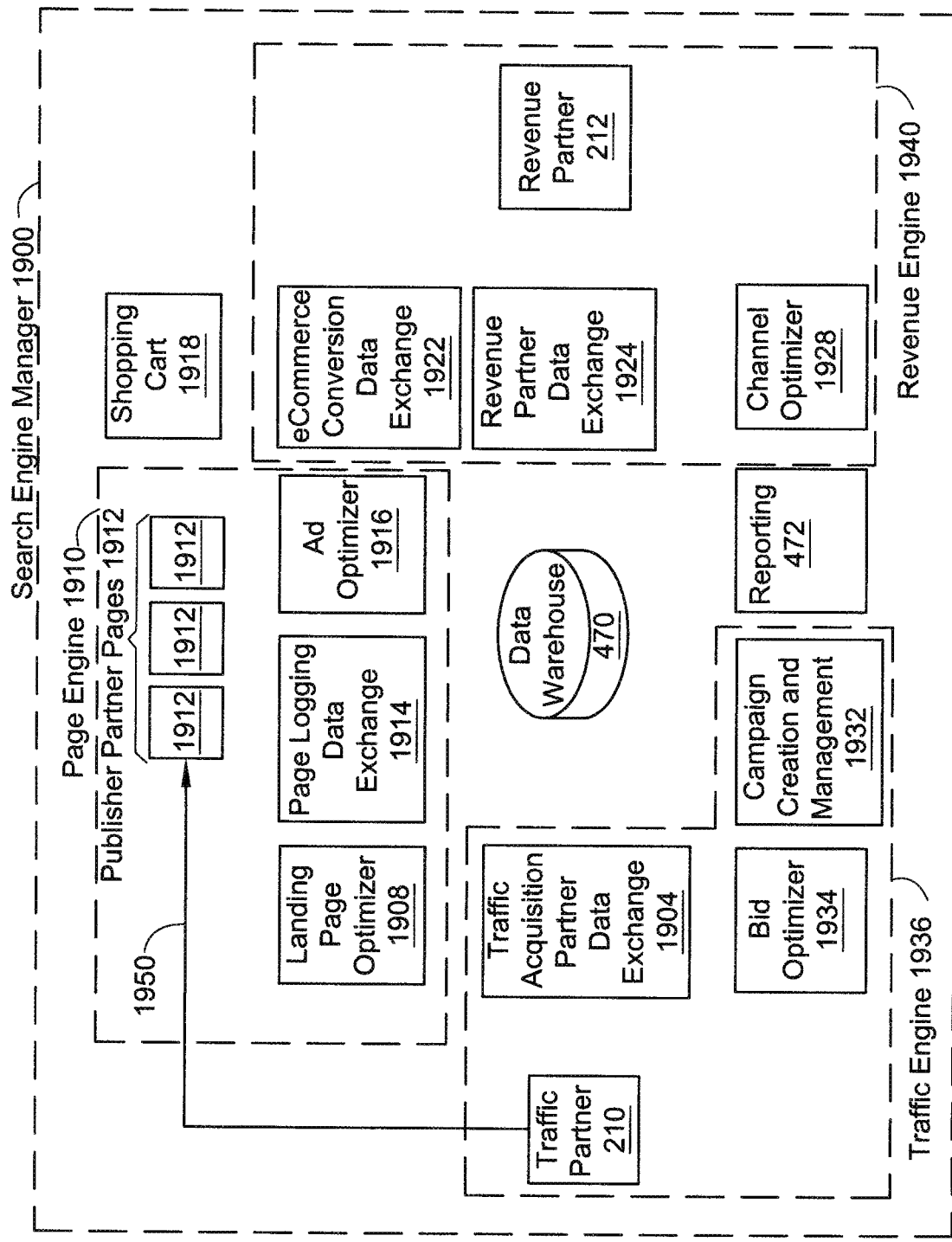

Referring now to FIG. 22, traffic partner 210 sites then begin to drive traffic to the publisher partner pages 1912 based on the parameters established during each of the campaigns as illustrated by step 1950, which joins traffic partner 210 to publisher partner pages 1912. Search engine manager 1900 has many monitoring features that allows it to know if any of its campaigns seem to be driving unwanted types of traffic (e.g., ineffective or too expensive).

Step 4: Monitoring Performance and Traffic Data

Figure 23:
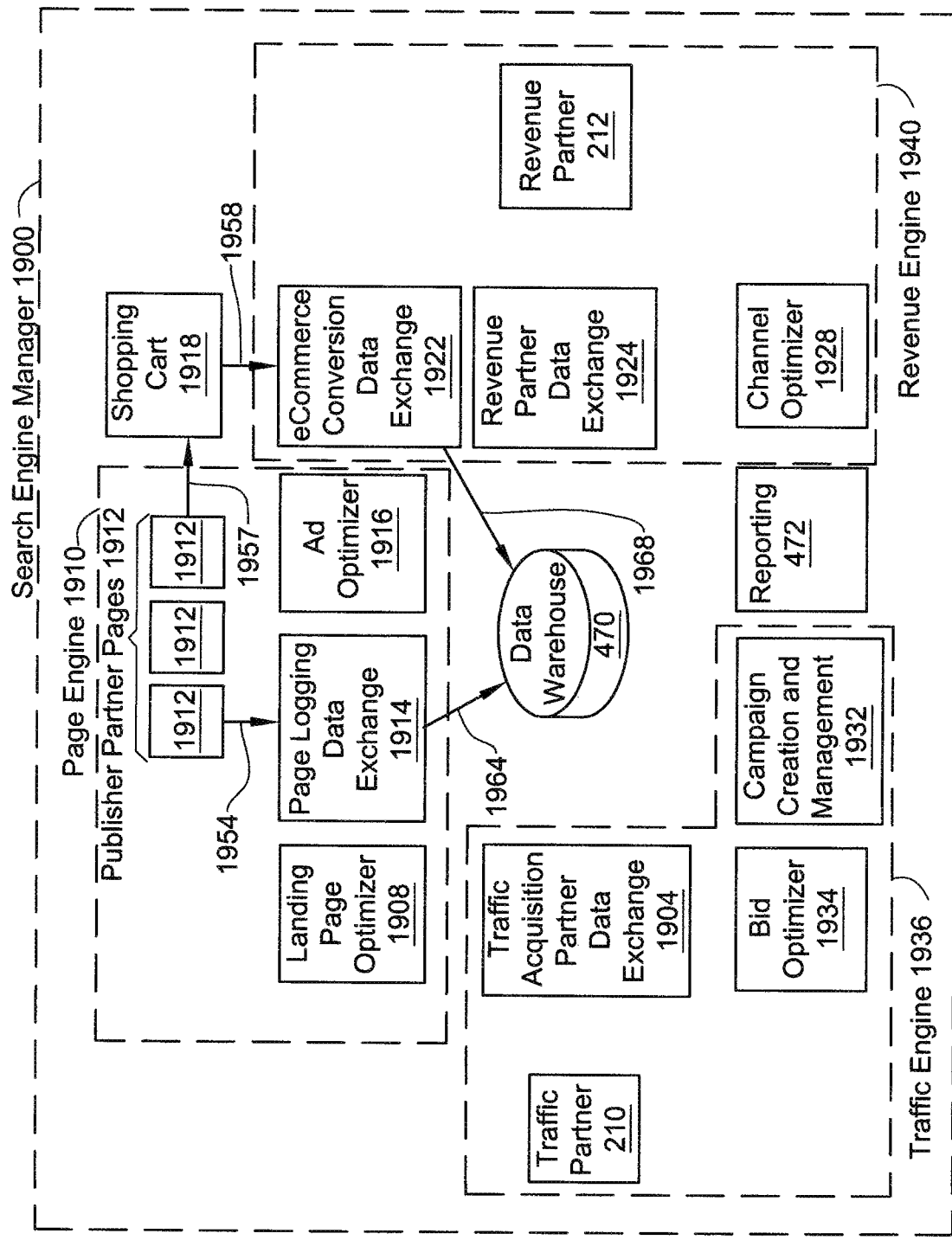

Referring now to FIG. 23, once traffic is being driven to publisher partner pages 1912 by the campaigns established previously, search engine manager 1900 begins to gather data about the behavior of visitors to these pages. These data are typically of several types:

1) For eCommerce and cost-per-action transactions that involve the visitor completing the purchase of a product or some other transaction defined by the advertiser, search engine manager 1900 may insert a tracking code on confirmation pages following the transaction that allows it to know when an eCommerce transaction has occurred. This tracking code also allows search engine manager 1900 to know how much revenue has been generated by that transaction.

2) For cost-per-click and cost-per-lead transactions that involve having a visitor click on an advertisement placed on publisher partner page 1912, search engine manager 1900 may include code on the page that logs the click on the ad in the web logs for that page. Some types of cost-per-click advertisements, including Google's AdSense™ ads, are contained in a frame that is populated directly by the ad partner. Search engine manager 1900 may not be able or desire to directly insert tracking code that allows it to know when one of these ads has been clicked. In such cases, search engine manager 1900 may include code on all of the pages that allows search engine manager 1900 to track the visitor's mouse position within the window being viewed. Search engine manager 1900 can then deduce that when the mouse cursor is over the ad frame (such as a Google AdSense™ frame) and the visitor then leaves the site, it is highly likely that the visitor clicked on one of the ads in that ad frame. In this way, search engine manager 1900 is able to track or at least estimate an outbound click on these ads without inserting a tracking code.

3) For cost-per-impression advertisements, search engine manager 1900 may insert tracking code on the block containing the advertisement in order to count the number of impressions received by the advertiser.

Data from all three of these transaction types are ultimately transferred to search engine manager's Data Warehouse 470 for use later in the process and for reporting purposes.

FIG. 23 step 4 is represented by the following substeps:
substep 1957, which joins publisher partner pages 1912 to shopping cart 1918,
substep 1954, which joins publisher partner pages 1912 to page logging data exchange 1914,
substep 1958, which joins shopping cart 1918 to eCommerce conversion data exchange 1922,
substep 1964, which joins page logging data exchange 1914 to data warehouse 470, and
substep 1968, which joins eCommerce data exchange 1922 to data warehouse 470.

Step 5: Collecting Traffic Cost Information

Figure 24:
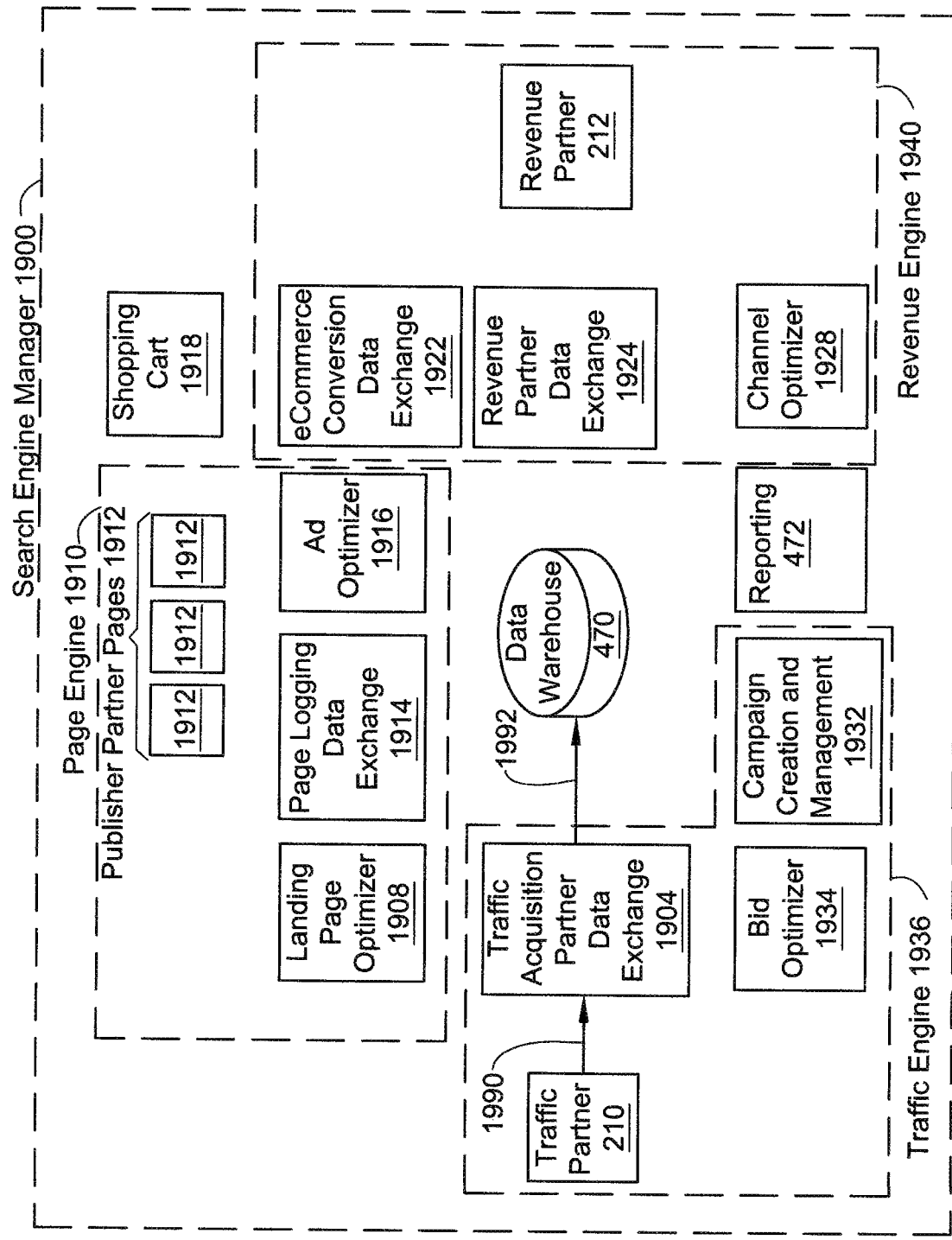

Referring now to FIG. 24, search engine manager 1900 may then periodically obtain information from each traffic partner 210 on how much is being paid for traffic to each of the publisher partner pages 1912 (in addition to other information). The data are typically available on a very granular basis, in most cases down to the particular keyword, advertisement and landing page combination. This information may be later used in the process to help calculate the profitability of each of the publisher partner pages 1912, to optimize landing page templates, to select ad partners and/or to improve ad copy. It may also used for reporting purposes. Step 5 is represented by substep 1990, which joins traffic partner 210 to traffic acquisition partner data exchange 1904, and substep 1992, which joins traffic partner data exchange 1904 to data warehouse 470.

Step 6: Collecting Revenue Information

Figure 25:
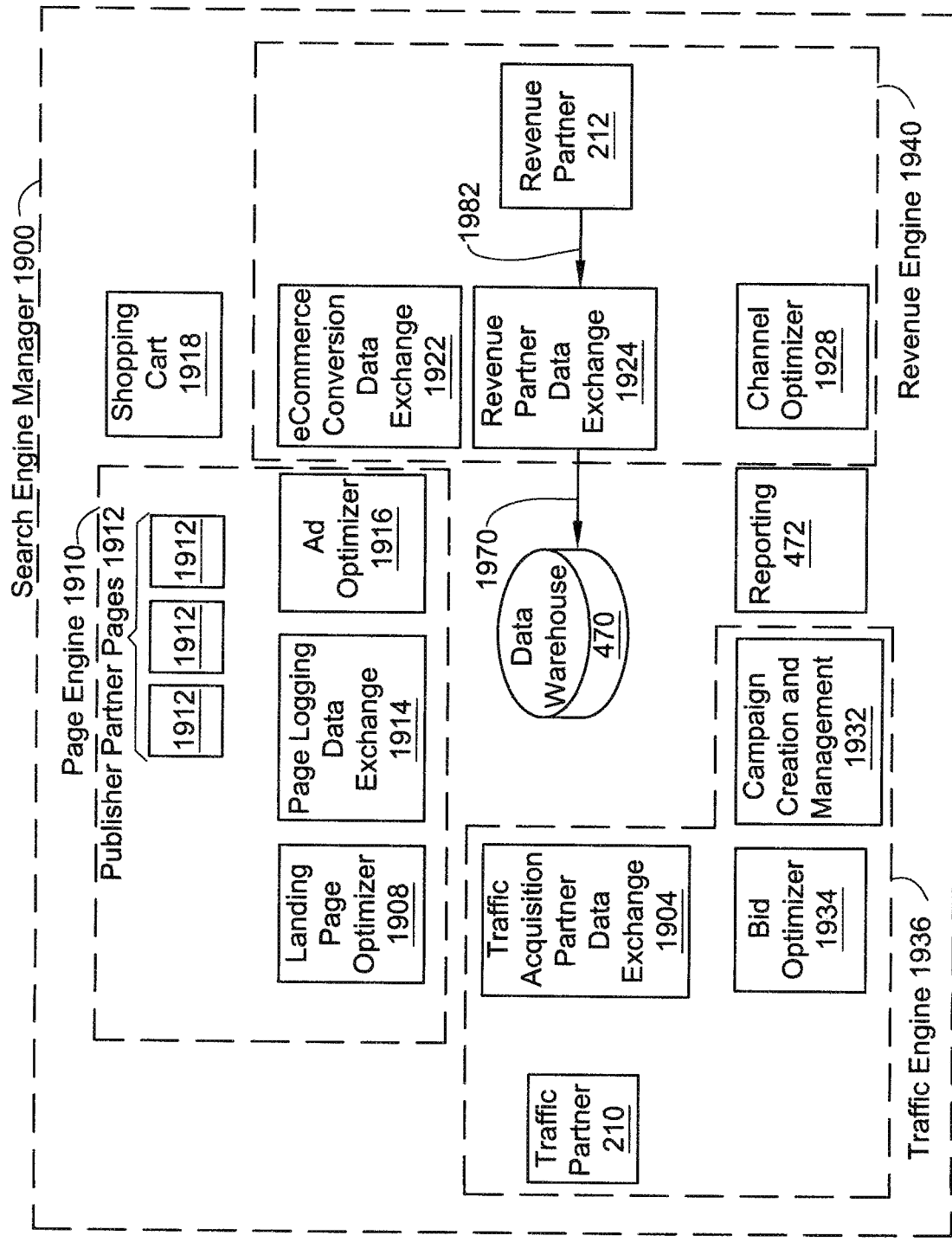

Referring now to FIG. 25, search engine manager 1900 may then periodically obtain information from each ad partner on how much revenue is being generated by visitors to publisher partner pages 1912. In some cases, this information may not be available on a particularly granular basis. For instance, for Google AdSense™, each of the publisher partner pages 1912 must be placed in one of 200 "channels" of data and the only revenue data available from AdSense™ is aggregated at the channel level. Therefore, it may be difficult to tell exactly how much revenue is being generated by each particular publisher partner page 1912 individually. Search engine manager 1900 may therefore use the traffic and performance data collected in Step 4 of this process. Search engine manager 1900 may look at the aggregate revenue data provided by each ad partner and calculate an estimate of the revenue from each transaction, click, impression or other action by dividing the aggregate revenue by the number of transactions, clicks or impressions. In this way, search engine manager 1900 can estimate the revenue per visitor for each of the publisher partner pages. Further, because the traffic and performance data collected in step 4 may be granular enough to indicate what keyword, ad copy and landing page drove the visit, search engine manager 1900 can calculate estimated revenue for each keyword, ad copy, landing page combination. Step 6 is represented by substep 1982, which connects revenue partner 212 to revenue partner data exchange 1924, and by substep 1970, which connects revenue partner data exchange 1924 to data warehouse 470.

Step 7: Optimizing Reporting Channels

Figure 26:
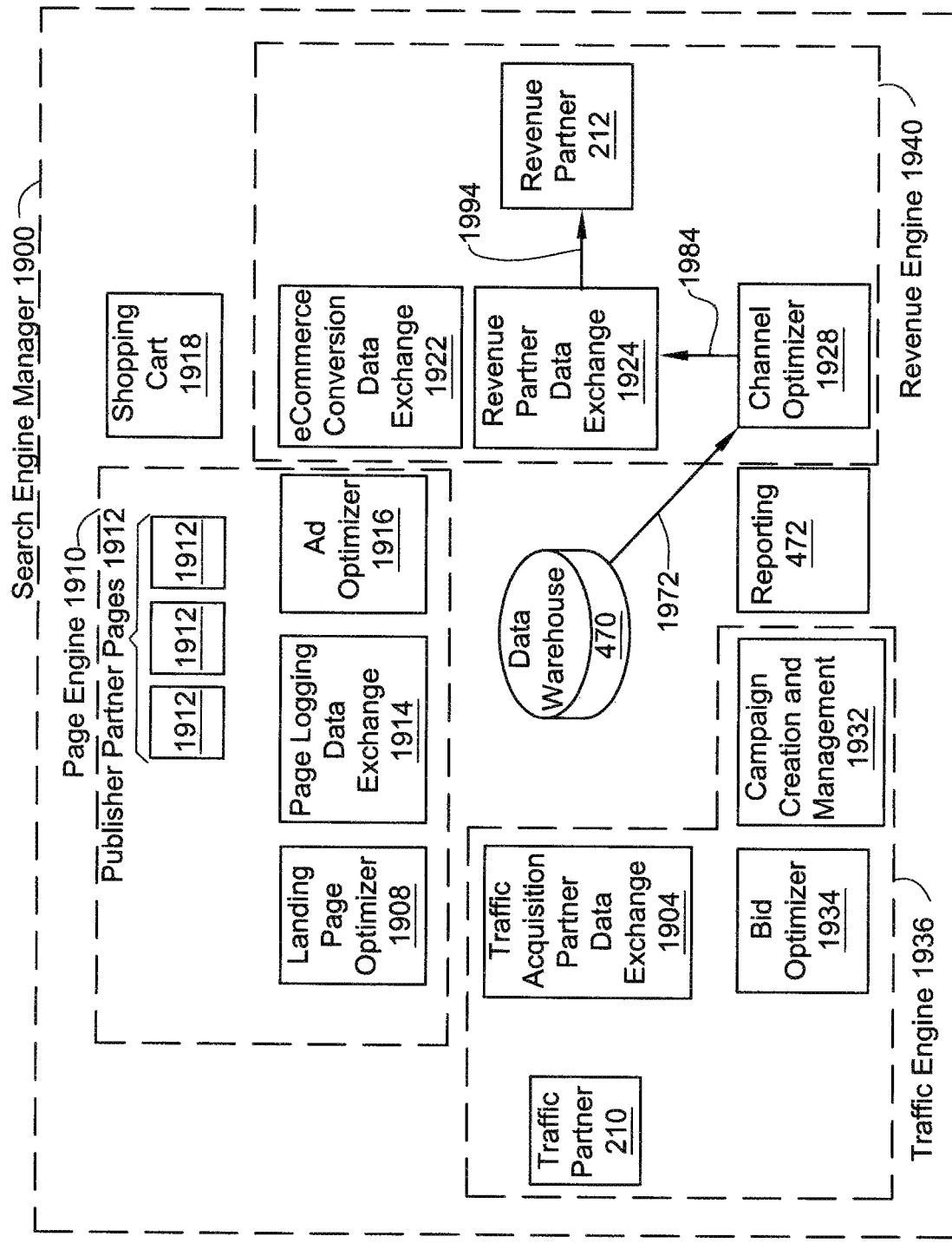

Referring now to FIG. 26, one of the limitations of the extrapolations being done by search engine manager 1900 in this step of the process is that the aggregate revenue data generally covers hundreds or thousands of publisher partner pages 1912. Therefore, revenue per visitor information derived for each individual page is actually influenced strongly by the other pages contained in the same group (or "channel" in the case of Google AdSense™). Search engine manager 1900 may overcomes this lack of granularity of reported data by rotating one or more of each publisher partner pages 1912 into a separate channel periodically to measure its revenue per visit performance without the bias or influence of any other publisher partner pages 1912. This allows more intelligent information to be gathered for that page. In addition, that channel may then be placed in a group or channel with other pages that have similar revenue per visit so that the difference between the pages with which it is aggregated, e.g. the bias, may be minimized. In a similar fashion, channel rotation may be used to measure the effectiveness of specific keywords, text ads, sources of traffic and even time of day variables, and channels for each publisher partner pages 1912 can then be selected based on these criteria as well. Step 7 is represented by substep 1972, which connects data warehouse 470 to channel optimizer 1928; by substep 1984, which connects channel optimizer 1928 to revenue partner data exchange 1924; and by substep 1994, which connects revenue partner data exchange 1924 to revenue partner 212.

Step 8: Re-Computing and Resetting Bids

Figure 27:
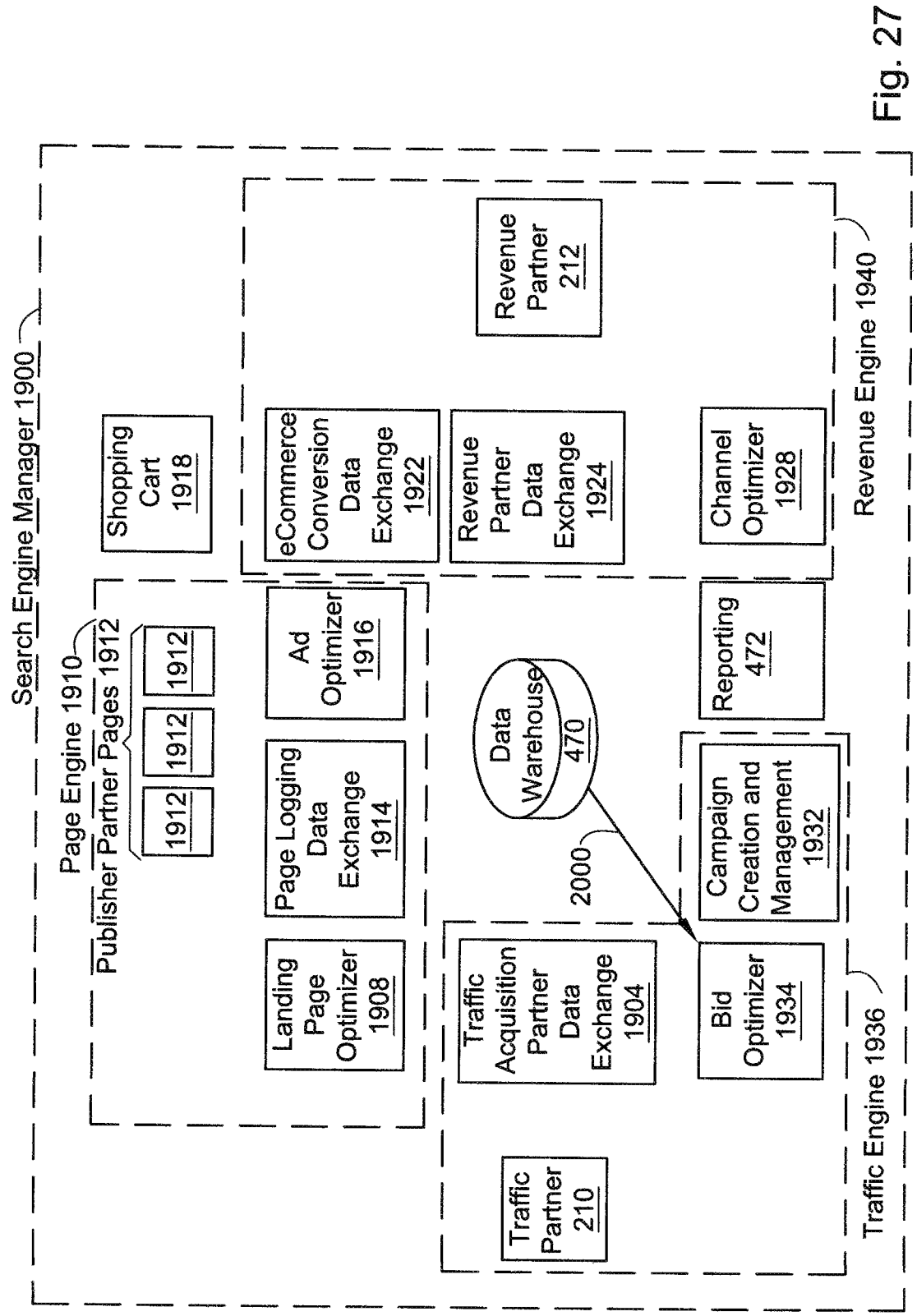

Referring now to FIG. 27, at this point, search engine manager 1900 may have collected and/or calculated information on how much revenue per visitor is being generated for each keyword, ad, landing page (KAP) combination, as well as how much is being spent to obtain a visitor for each KAP combination. Search engine manager 1900 uses this information to calculate a new bid for each KAP combination and may push this information to each traffic partner through the APIs described above.

Search engine manager 1900 can determine an appropriate bid in one of a couple of ways. One method is to use business rules to determine the appropriate bid for each KAP combination. Some of these business rules may be fairly simple. For instance, one rule might specify that a 40% return on ad spending must be generated for each keyword buy, so if $0.14 is generated by a visitor to a page through a particular KAP combination, the bid for that KAP combination may be set to $0.10 because the $0.04 in profit per visitor is a 40% return on the $0.10 ad spending.

A second method search engine manager 1900 may use to determine an appropriate bid for each KAP combination is to seek to maximize total gross margin dollars by, for example, increasing the bid for a KAP combination to the point at which the increased revenue due to higher traffic from a higher bid is offset by the higher overall costs across all visitors and results in lower total margin dollars. Calculating this maximum gross margin point in the curve requires complex statistical calculations and significant testing on the part of search engine manager 1900.

Step 8 is represented by substep 2000, which connects data warehouse 470 to bid optimizer 1934; substep 2002, which connects bid optimizer 1934 to traffic acquisition partner data exchange 1904; and substep 2004, which connects traffic acquisition partner data exchange 1904 to traffic partner 210.

Step 9: Page Templates and Ad Partners Optimized

Figure 28:
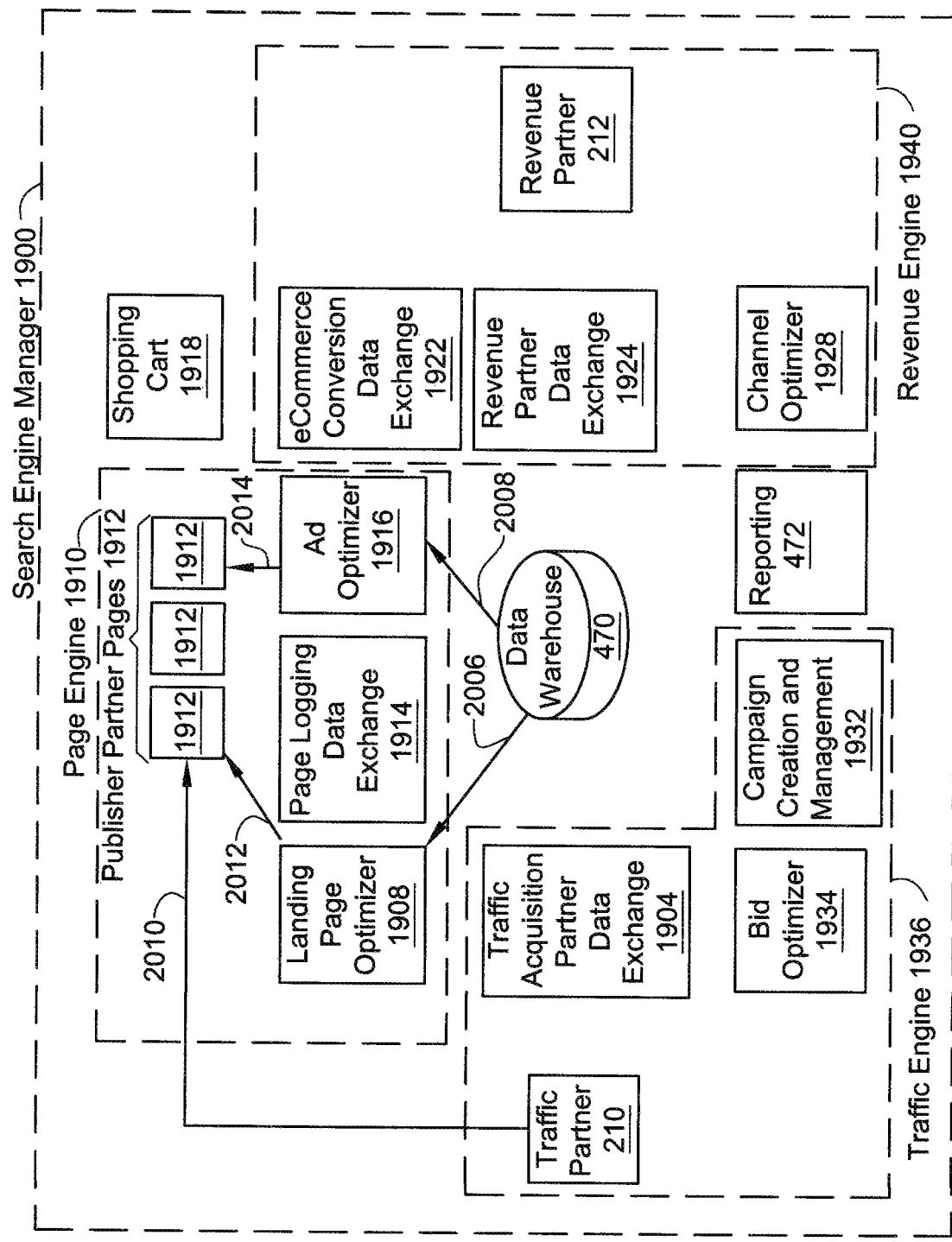

Referring now to FIG. 28, in parallel with the maintenance of routine traffic buys, search engine manager 1900 may have the capability to refine landing page templates through empirical testing. This may be done for example through a combination of simple A/B and multivariate testing. Likewise, search engine manager 1900 may continuously test which ad partners generate maximum revenues for each ad placement on the publisher partner pages 1912. Search engine manager 1900 may integrate ads from multiple ad partners and select the ad partner that is likely to perform best in each placement on each publisher partner page by testing multiple combinations through A/B and multivariate testing. Search engine manager 1900 may be capable of selecting different ad partners (and therefore different advertisements) based on many criteria, each of which search engine manager 1900 may track and test. Among the criteria may be: time of day and day of week, geographical location of the visitor to the page and past browsing behavior of individual visitors. Through this process of continuous testing and improvement, revenue per visitor may be increased and cost per visitor may be decreased (or number of visitors is increased) thereby optimizing and/or maximizing overall profitability.

Step 9 is represented by the following substeps:
  substep 2006, which connects data warehouse 470 to landing page optimizer 1908,
  substep 2008, which connects data warehouse 470 to ad optimizer 1916,
  substep 2010, which connects traffic partner 210 to publisher partner pages 1912,
  substep 2012, which connects landing page optimizer 1908 to publisher partner pages 1912, and
  substep 2014, which connects ad optimizer 1916 to publisher partner pages 1912.

Search engine manager 1900 provides a closed-loop process of continuous improvement that may optimize or maximize the profitability of buying traffic to web pages. This process may be applied periodically for each web page. Because it is a ongoing process, the process may be able to quickly adjust to changing market conditions (such as a sudden increase in the cost of buying traffic) without losing profitability. And because of the high level of automation of the process, search engine manager 1900 may be advantageously implemented for many, if not all pages, of a website rather than just select landing pages as is conventionally done. In short, search engine manager 1900 is a fully automated search engine marketing solution that can be used on every page of a website and every article in a web publisher's library.

What is claimed is:

1. A method comprising:
    identifying a referring source from which a user was directed to a page of a content serving system, wherein the user navigated to the page from a referring page associated with the referring source, wherein the content serving system is capable of displaying content in the page using multiple alternative templates, each template of which comprising different design features of the page;
    determining, based on the referring source, a selection of a specific template from the multiple alternative templates for the user, wherein the specific template defines a design feature; and
    displaying the content to the user using the design feature of the specific template, wherein the content comprises an article.

2. The method of claim 1, wherein the referring source is one of: a traffic partner, a web site, and a search engine.

3. The method of claim 1, wherein the selection of the specific template is determined based on at least one of: a time of day, a day of week and a geographical location of the user.

4. The method of claim 1, wherein the selection of the specific template is determined based on past browsing behavior of the user.

5. The method of claim 1 further comprising, displaying the article in accordance with the selection of the specific template.

6. The method of claim 1 wherein the specific template replaces a previous template that was previously used to display the content.

7. The method of claim 1, wherein said displaying the content using the design feature comprises at least one of: modifying a size of a content element of the content, and modifying a placement of the content element.

8. The method of claim 1, wherein said displaying the content using the design feature comprises at least one of: modifying a body text attribute of a content element of the content, and modifying a heading attribute of the content element.

9. The method of claim 1, wherein said displaying comprises removing from a display of the page a content element of the content.

10. The method of claim 1, wherein the page comprises a web page.

11. The method of claim 1, wherein the page comprises a web page of a content owner and includes content element owned by an entity other than the content owner.

12. A system comprising a processor, the processor being configured to:
    identify a referring source form which a user was directed to a page of a content serving system, wherein the user navigated to the page from a referring page associated with the referring source, wherein the content serving system is capable of displaying content in the page using multiple alternative templates, each template of which comprising different design features;
    determine, based on the referring source, a selection of a specific template from the multiple alternative templates for the user, wherein the specific template defines a desing feature; and
    display the content to the user using the design feature of the specific template, wherein the content comprises an article.

13. The system of claim 12, wherein the selection of the specific template is determined based on at least one of: a time of day, a day of week, a past browsing behavior of the user, and a geographical location of the user.

14. The system of claim 12 further comprising the content serving system.

15. The system of claim 12, wherein said displaying the content using the design feature comprises at least one of: modifying a size of a content element of the content, and modifying a placement of the content element.

16. The system of claim 12, wherein said displaying the content using the design feature comprises at least one of: modifying a body text attribute of a content element of the content, and modifying a heading attribute of the content element.

17. The system of claim 12, wherein said displaying comprises removing from a display of the page a content element of the content.

18. The system of claim 12, wherein the page comprises a web page.

19. A non-transitory computer readable storage medium retaining program instructions, which program instructions when read by a processor, cause the processor to perform a method comprising:
    identifying a referring source from which a user was directed to a page of a content serving system, wherein the user navigated to the page from a referring page associated with the referring source, wherein the content serving system is capable of displaying content in the page using multiple alternative templates, each template of which comprising different design features of the page;
    determining, based on the referring source, a selection of a specific template from the multiple alternative templates for the user, wherein the specific template defines a design feature; and
    displaying the content to the user using the desing feature of the specific template, wherein the content comprises an article.

20. The non-transitory computer readable storage medium of claim 19, wherein said displaying the content using the design feature comprises at least one of:
    modifying a size of a content element of the content;
    modifying a placement of the content element;
    modifying a body text attribute of the content element;
    modifying a heading attribute of the content element; and
    removing from a display of the page the content element.

* * * * *